United States Patent
Tseng et al.

(10) Patent No.: US 10,466,435 B2
(45) Date of Patent: Nov. 5, 2019

(54) DUAL LENS DRIVING APPARATUS AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Yung-Chun Kang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 248 days.

(21) Appl. No.: 15/585,403

(22) Filed: May 3, 2017

(65) Prior Publication Data

US 2018/0224625 A1 Aug. 9, 2018

(30) Foreign Application Priority Data

Feb. 9, 2017 (TW) .............................. 106201930 U

(51) Int. Cl.
| | | |
|---|---|---|
| G02B 7/09 | (2006.01) | |
| G02B 7/02 | (2006.01) | |
| H04N 5/225 | (2006.01) | |
| H04M 1/02 | (2006.01) | |
| G03B 13/34 | (2006.01) | |
| G02B 27/01 | (2006.01) | |

(52) U.S. Cl.
CPC .............. *G02B 7/09* (2013.01); *G02B 7/021* (2013.01); *G02B 27/017* (2013.01); *G03B 13/34* (2013.01); *H04M 1/0264* (2013.01); *H04N 5/2253* (2013.01); *H04N 5/2258* (2013.01); *G03B 2205/0069* (2013.01)

(58) Field of Classification Search
None
See application file for complete search history.

(56) References Cited

U.S. PATENT DOCUMENTS

| | | |
|---|---|---|
| 7,885,023 B2 | 2/2011 | Kim |
| 7,932,648 B2 | 4/2011 | Jung |
| 8,030,806 B2 | 10/2011 | Jung |
| 8,274,748 B1 | 9/2012 | Chiang |
| 8,319,886 B1 | 11/2012 | Wang et al. |
| 8,451,553 B2 | 5/2013 | Kim |
| 8,537,226 B2 | 9/2013 | Ke |
| 8,743,473 B2 | 6/2014 | Wu et al. |
| 8,941,721 B2 | 1/2015 | Kim et al. |
| 9,057,812 B2 | 6/2015 | Okuyama et al. |

(Continued)

*Primary Examiner* — Sinh Tran
*Assistant Examiner* — Quan Pham
(74) *Attorney, Agent, or Firm* — McClure, Qualey & Rodack, LLP

(57) ABSTRACT

A dual lens driving apparatus includes a holder, a metal yoke, a carrier, a coil, a first magnet, a first elastic element and a second elastic element. The metal yoke is corresponding to the holder and includes a front end which includes a plate surface and a plurality of step portions, and a level difference is between each of the step portions and the plate surface. The carrier is movably disposed in the metal yoke. The coil is disposed around the carrier. The first magnet is disposed in the metal yoke. The first elastic element is assembled on a side of the carrier facing the front end of the metal yoke. The second elastic element is assembled on another side of the carrier facing the holder.

15 Claims, 23 Drawing Sheets
(1 of 23 Drawing Sheet(s) Filed in Color)

(56) References Cited

U.S. PATENT DOCUMENTS

| | | | |
|---|---|---|---|
| 9,083,873 B1* | 7/2015 | Lewkow | G02B 7/021 |
| 9,323,023 B2 | 4/2016 | Hsu et al. | |
| 9,392,188 B2 | 7/2016 | Shabtay et al. | |
| 9,494,769 B2 | 11/2016 | Cheng et al. | |
| 10,063,756 B2* | 8/2018 | Kim | G02B 5/005 |
| 2013/0194676 A1* | 8/2013 | Sannokyou | G02B 3/0037 |
| | | | 359/642 |
| 2013/0201391 A1* | 8/2013 | Ogasahara | H04N 5/2254 |
| | | | 348/374 |
| 2014/0340775 A1* | 11/2014 | Hsu | H04M 1/0264 |
| | | | 359/824 |
| 2015/0055231 A1* | 2/2015 | Hagiwara | G02B 7/026 |
| | | | 359/811 |
| 2015/0070781 A1 | 3/2015 | Cheng et al. | |
| 2015/0277081 A1* | 10/2015 | Hagiwara | G02B 7/09 |
| | | | 359/818 |
| 2015/0316744 A1 | 11/2015 | Chen | |
| 2015/0316745 A1 | 11/2015 | Chen et al. | |
| 2017/0353634 A1* | 12/2017 | Kim | G02B 5/005 |
| 2017/0363837 A1* | 12/2017 | Fan | G02B 7/09 |
| 2018/0039161 A1* | 2/2018 | Moto | G02B 7/08 |
| 2018/0048799 A1* | 2/2018 | Bachar | G02B 13/003 |
| 2018/0074279 A1* | 3/2018 | Liu | G02B 7/023 |
| 2018/0100984 A1* | 4/2018 | Wu | G02B 7/023 |
| 2018/0164539 A1* | 6/2018 | Hsu | G02B 7/10 |
| 2018/0180838 A1* | 6/2018 | Wu | G02B 7/09 |
| 2018/0309916 A1* | 10/2018 | Park | H04N 5/2253 |

* cited by examiner

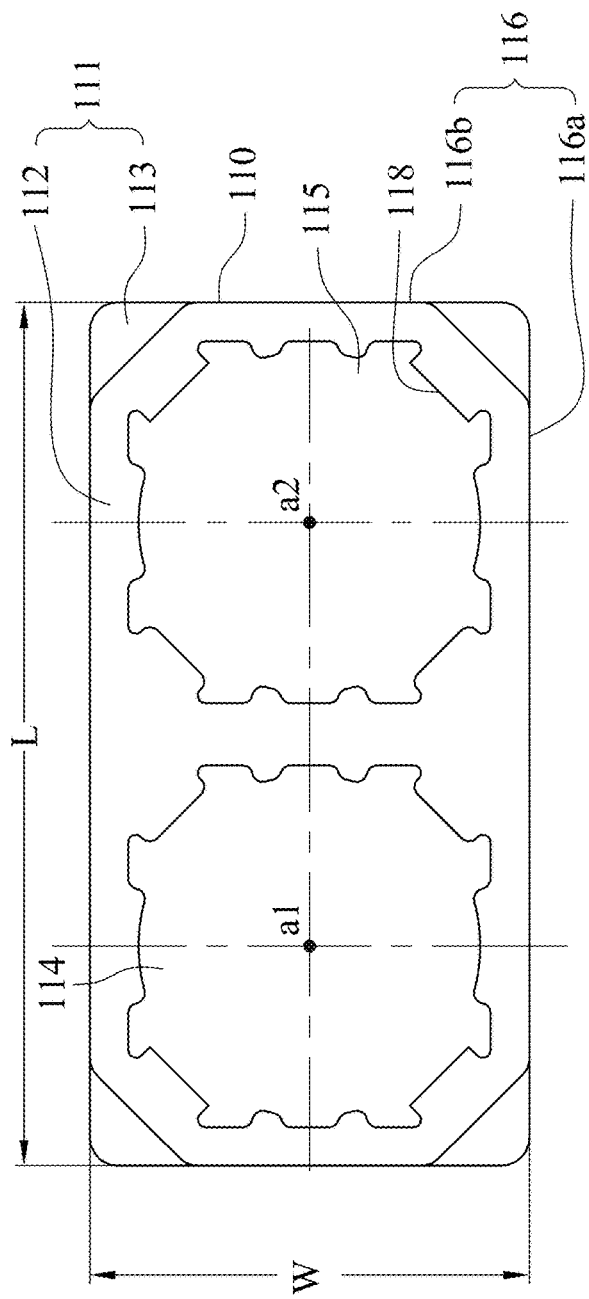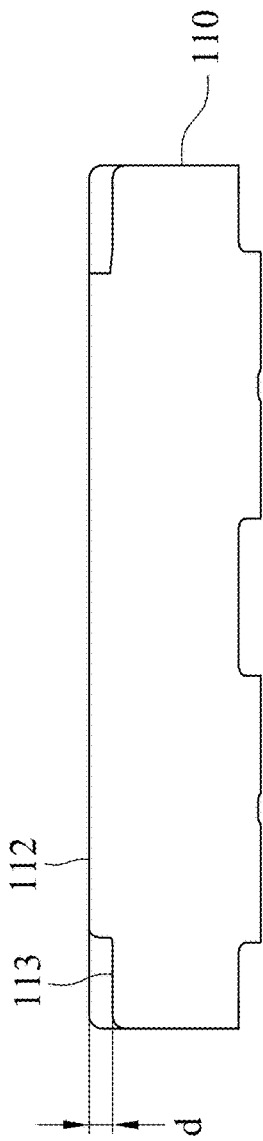
Fig. 1G
Fig. 1H

DUAL LENS DRIVING APPARATUS AND ELECTRONIC DEVICE

RELATED APPLICATIONS

This application claims priority to Taiwan Application Serial Number 106201930, filed Feb. 9, 2017, which is herein incorporated by reference.

BACKGROUND

Technical Field

The present disclosure relates to a lens driving apparatus. More particularly, the present disclosure relates to a dual lens driving apparatus applicable to a portable electronic device.

Description of Related Art

Nowadays, a lens assembly employed in an electronic device normally adopt a voice coil motor (VCM) as an autofocus mechanism. The elastic piece of the voice coil motor can drive the carrier which carries the lens assembly. Specifically, the deformation of the elastic piece caused by external force provides the degree of freedom and the restoring force required by the movement of the carrier, whereby the autofocus functionality can be achieved.

For satisfying a variety of requirements of photographing, the electronic device equipped with two lens assemblies gradually becomes the mainstream in the market. However, the two lens assemblies of the conventional electronic device are driven by two different voice coil motors, which lengthens the entire focusing time and results in high electric energy consumption.

Accordingly, how to improve the dual lens driving apparatus so as to reduce the entire focusing time and electric energy consumption has become one of the most important goal of relevant industry.

SUMMARY

According to one aspect of the present disclosure, a dual lens driving apparatus includes a holder, a metal yoke, a carrier, a coil, a first magnet, a first elastic element and a second elastic element. The holder includes at least one holder opening. The metal yoke is corresponding to the holder and includes a front end. The front end includes a plate surface and a plurality of step portions. The plate surface includes at least one yoke opening, wherein the yoke opening is corresponding to the holder opening. A level difference is between each of the step portions and the plate surface. The carrier is movably disposed in the metal yoke, wherein the carrier includes a first receiving space and a second receiving space for respectively receiving a first lens assembly and a second lens assembly. A central axis of the first receiving space is parallel to a central axis of the second receiving space, and a moving direction of the carrier is parallel to the central axis of the first receiving space and the central axis of the second receiving space. The coil is disposed around the carrier. The first magnet is disposed in the metal yoke, wherein the first magnet is corresponding to the step portions and the coil. The first elastic element is assembled on a side of the carrier facing the front end of the metal yoke. The first elastic element is disposed between the step portions and the first magnet. The second elastic element is assembled on another side of the carrier facing the holder. The second elastic element includes at least two elastic members. The elastic members are electrically separated with each other and are arranged on a same plane.

According to another aspect of the present disclosure, an electronic device includes the dual lens driving apparatus according to the aforementioned aspect, the first lens assembly, the second lens assembly and two image sensors. The first lens assembly is disposed in the first receiving space. The second lens assembly is disposed in the second receiving space. The two image sensors are respectively disposed on an image surface of the first lens assembly and an image surface of the second lens assembly.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows:

FIG. 1F(b) is an enlarged view of a portion b' shown in FIG. 1E;

FIG. 1F(c) is an enlarged view of a portion c' shown in FIG. 1E;

FIG. 1G is a top view of a metal yoke shown in FIG. 1A;

FIG. 1H is a side view of the metal yoke shown in FIG. 1A;

DETAILED DESCRIPTION

1st Embodiment

Figure 1A:
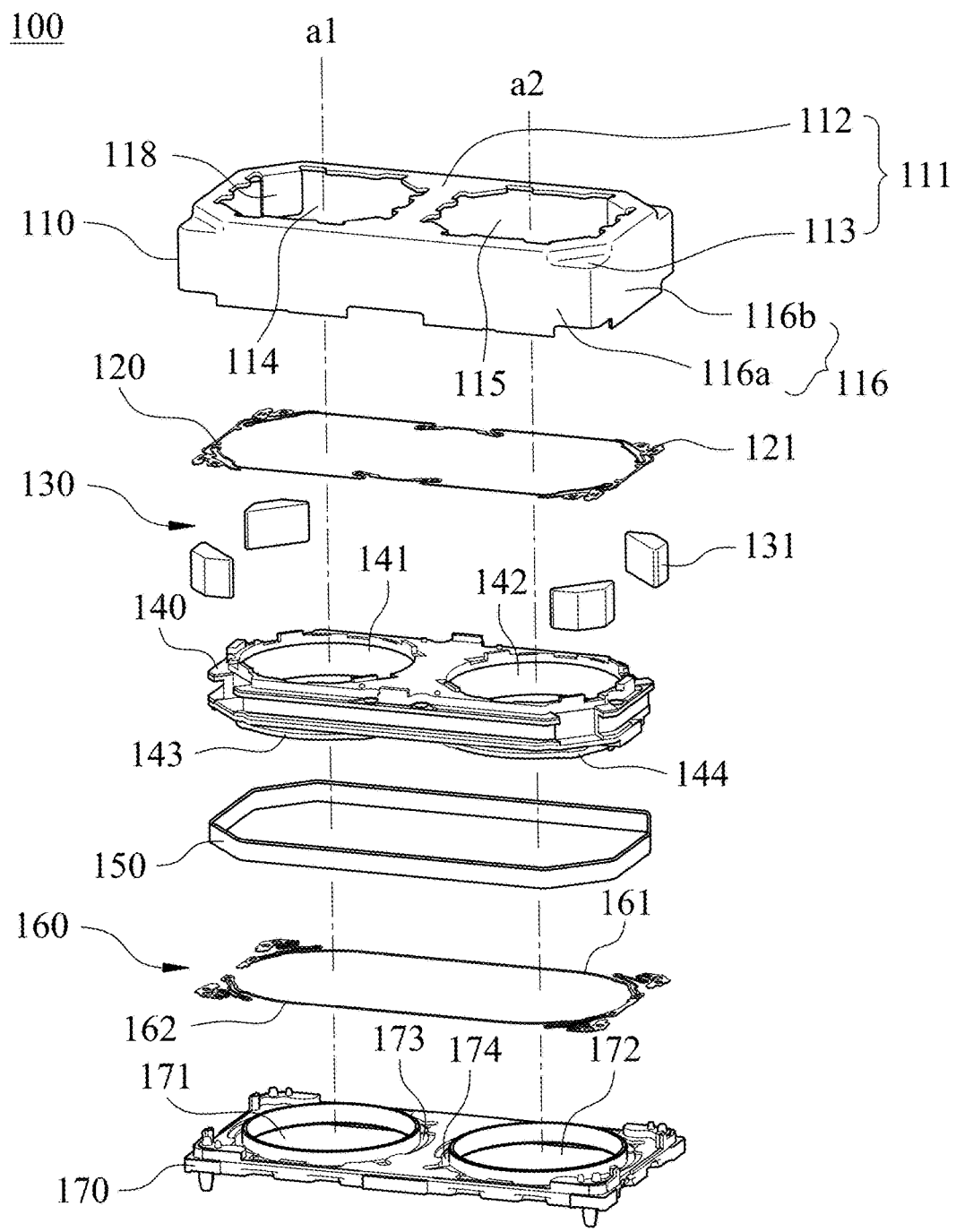
FIG. 1A is an exploded view of a dual lens driving apparatus according to the 1st embodiment of the present disclosure.

FIG. 1A is an exploded view of a dual lens driving apparatus 100 according to the 1st embodiment of the present disclosure. In FIG. 1A, the dual lens driving apparatus 100 includes a metal yoke 110, a first elastic element 120, a first magnet 130, a carrier 140, a coil 150, a second elastic element 160 and a holder 170. The metal yoke 110 is corresponding to the holder 170 so as to form an accommodating space (its reference numeral is omitted). The first elastic element 120, the first magnet 130, the carrier 140, the coil 150 and the second elastic element 160 are disposed in the metal yoke 110. Specifically, the first elastic element 120, the first magnet 130, the carrier 140, the coil 150 and the second elastic element 160 are disposed in the accommodating space formed by the metal yoke 110 and the holder 170.

Figure 1B:
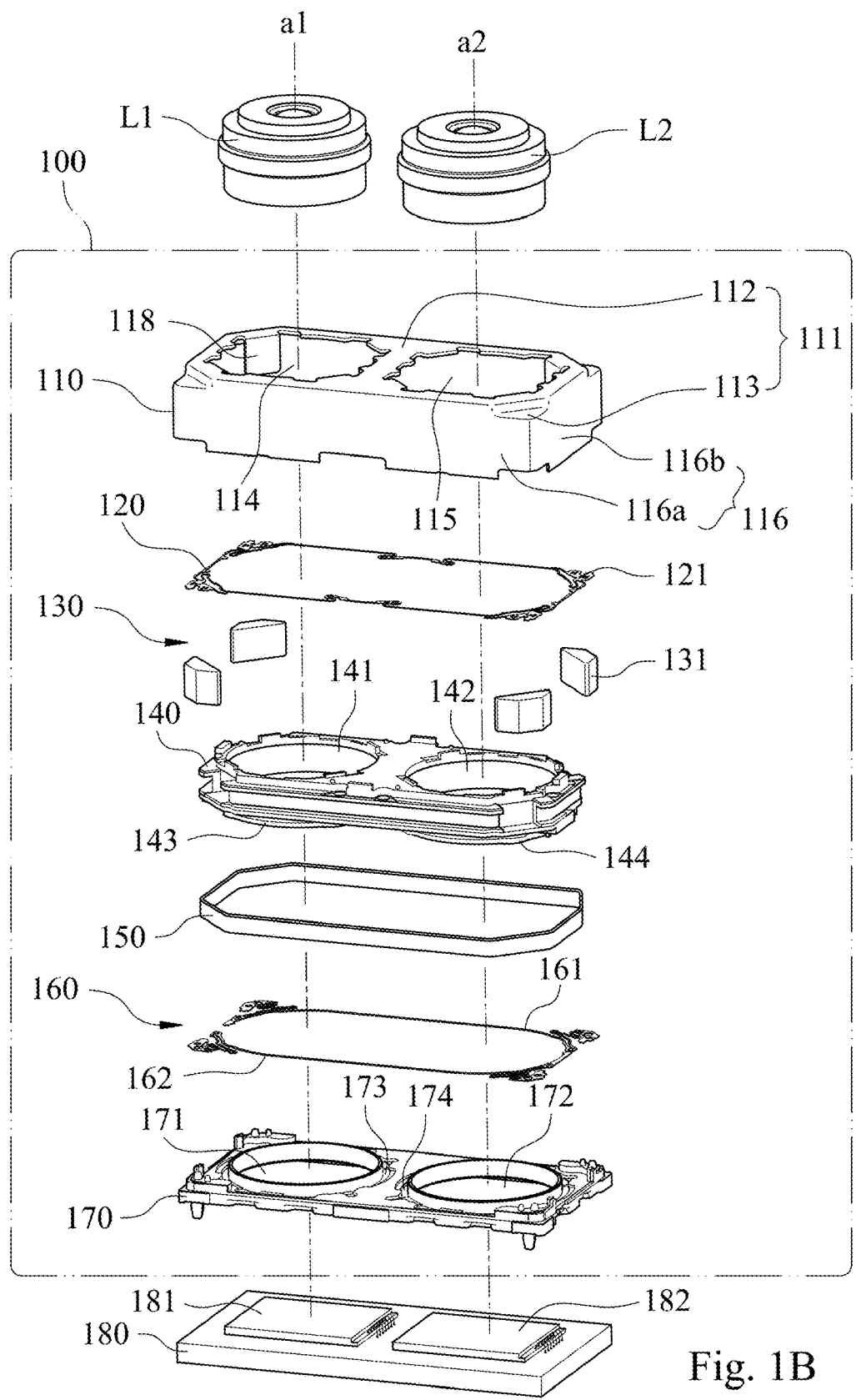
FIG. 1B is an exploded view of the dual lens driving apparatus shown in FIG. 1A, a first lens assembly, a second lens assembly and a circuit board.
Figure 1C:
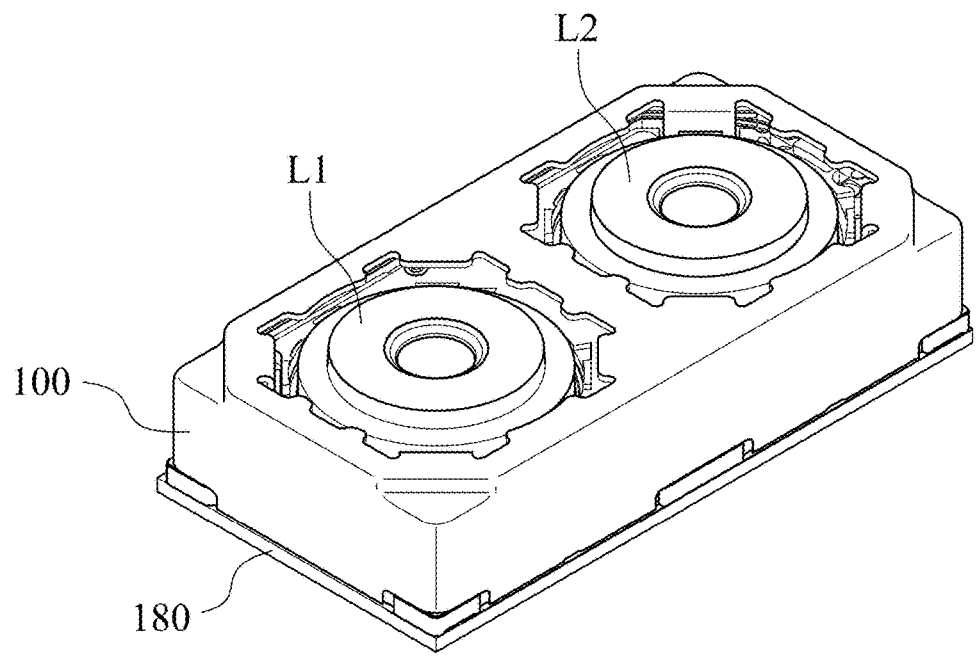
FIG. 1C is a three-dimensional view of the dual lens driving apparatus, the first lens assembly, the second lens assembly and the circuit board shown in FIG. 1B in a combination state.
Figure 1D:
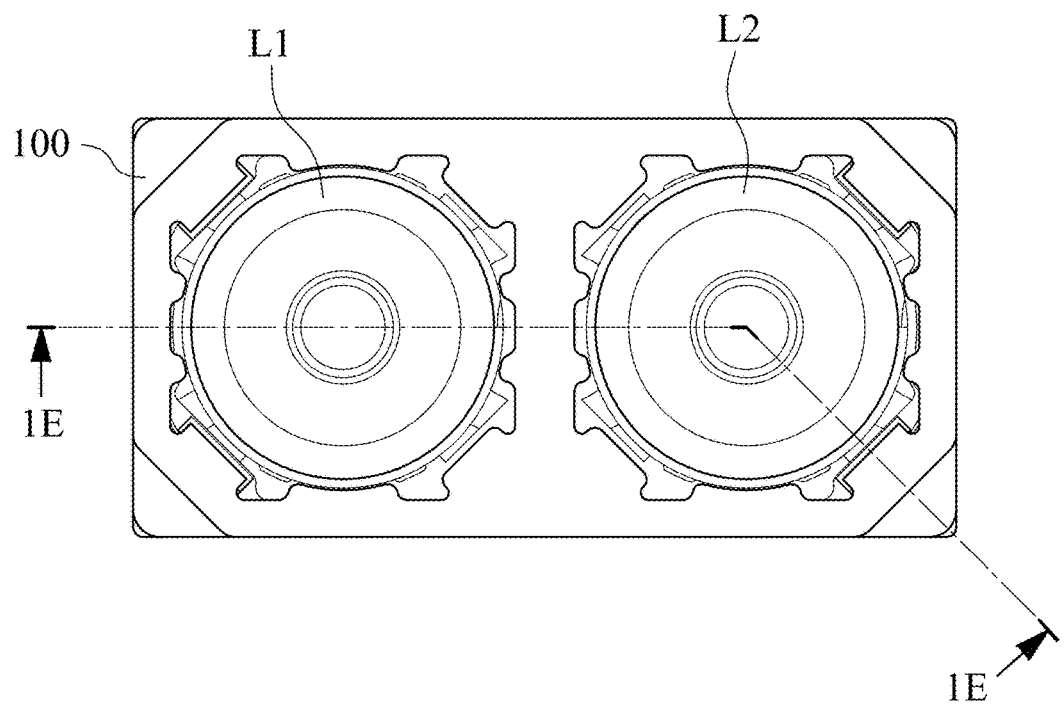
FIG. 1D is a top view of the dual lens driving apparatus, the first lens assembly, the second lens assembly and the circuit board shown in FIG. 1C.
Figure 1E:
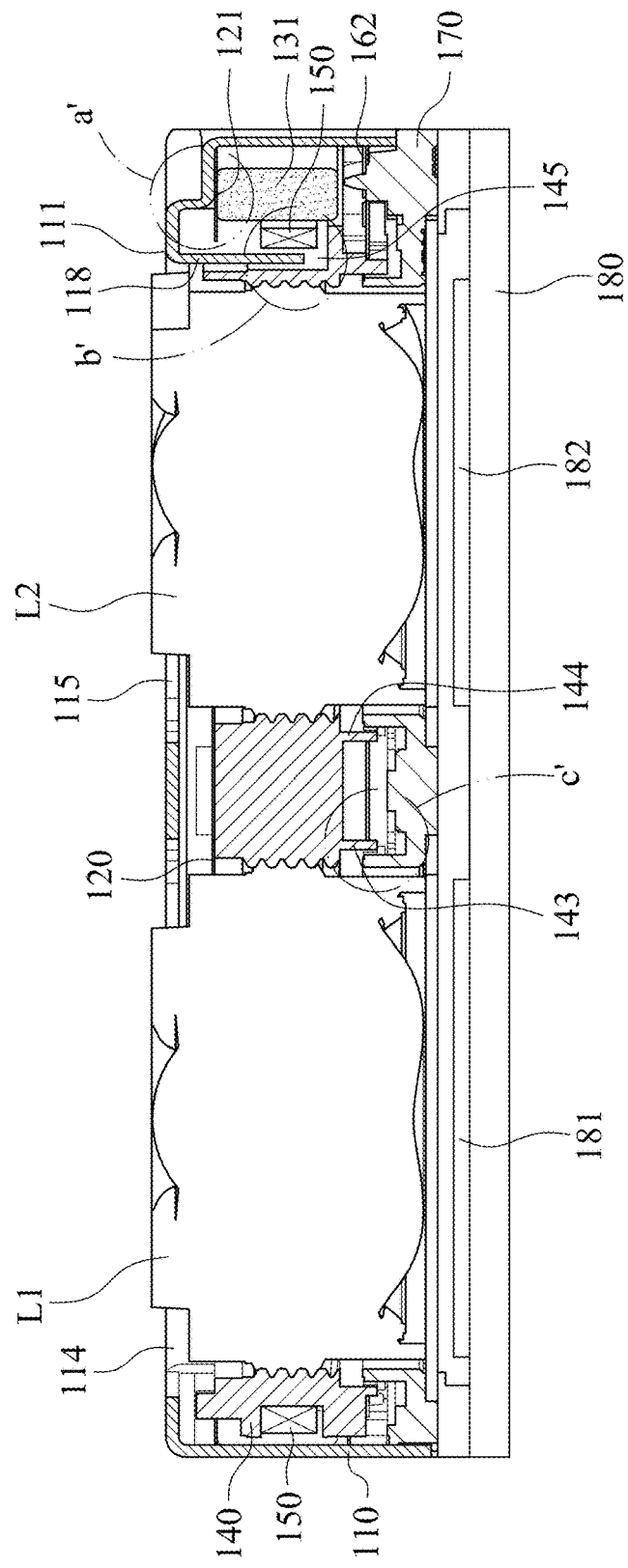
FIG. 1E is a cross-sectional view taken along line 1E-1E of the dual lens driving apparatus, the first lens assembly, the second lens assembly and the circuit board shown in FIG. 1D.
Figure 1F:
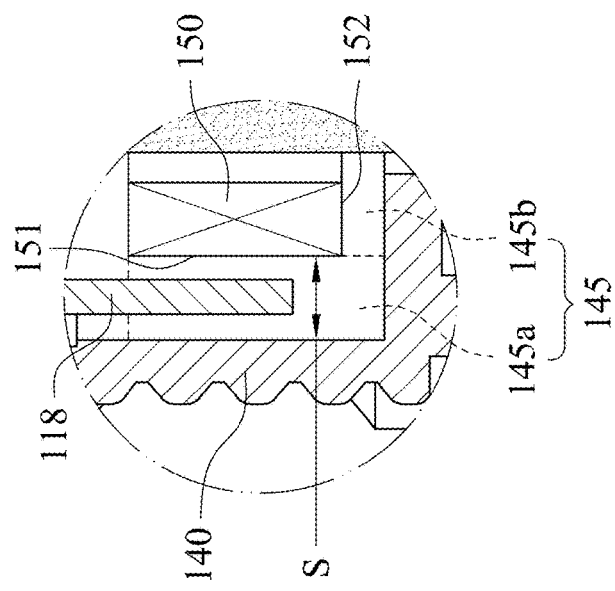
FIG. 1F(a) is an enlarged view of a portion a' shown in FIG. 1E.
Figure 1F:
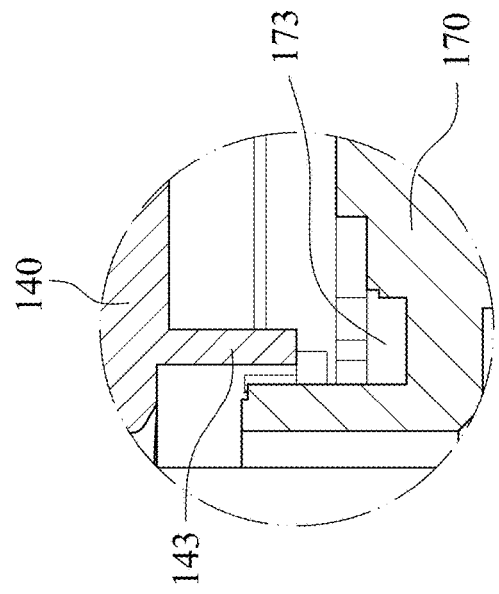
Figure 1F:
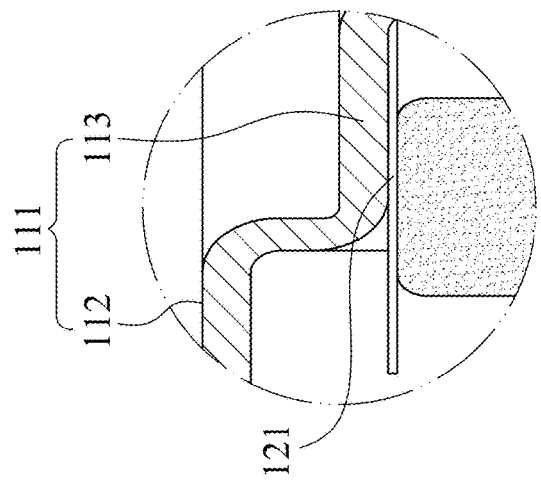

FIG. 1B is an exploded view of the dual lens driving apparatus 100 shown in FIG. 1A, a first lens assembly L1, a second lens assembly L2 and a circuit board 180. FIG. 10 is a three-dimensional view of the dual lens driving apparatus 100, the first lens assembly L1, the second lens assembly L2 and the circuit board 180 shown in FIG. 1B in a combination state. FIG. 1D is a top view of the dual lens driving apparatus 100, the first lens assembly L1, the second lens assembly L2 and the circuit board 180 shown in FIG. 10. FIG. 1E is a cross-sectional view taken along line 1E-1E of the dual lens driving apparatus 100, the first lens assembly L1, the second lens assembly L2 and the circuit board 180 shown in FIG. 1D. FIG. 1F(a) is an enlarged view of a portion a' shown in FIG. 1E. FIG. 1F(b) is an enlarged view of a portion b' shown in FIG. 1E. FIG. 1F(c) is an enlarged view of a portion c' shown in FIG. 1E. As shown in FIGS. 1B-1E, the dual lens driving apparatus 100 is configured to drive the first lens assembly L1 and the second lens assembly L2.

In the dual lens driving apparatus 100 according to the 1st embodiment, the holder 170 includes two holder openings, which are a first holder opening 171 and a second holder opening 172. Therefore, the number of components of the holder 170 can be reduced, and the efficiency of automatic assembly can be enhanced. In other embodiments, the number of the holder openings can be greater than or equal to one. That is, the number of the holder openings is not limited to two.

The metal yoke 110 is corresponding to the holder 170. The metal yoke 110 can be connected to the holder 170 via coupling. The metal yoke 110 includes a front end 111. The front end 111 includes a plate surface 112 and four step portions 113. A level difference d (shown in FIG. 1H) is between each of the step portions 113 and the plate surface 112. The plate surface 112 includes two yoke openings, which are a first yoke opening 114 and a second yoke opening 115. The first yoke opening 114 is corresponding to the first holder opening 171, and the second yoke opening 115 is corresponding to the second holder opening 172. In other embodiments, the number of the yoke openings can be greater than or equal to one. That is, the number of the yoke openings is not limited to two.

The carrier 140 is movably disposed in the metal yoke 110. The carrier 140 includes a first receiving space 141 and a second receiving space 142 for receiving the first lens assembly L1 and the second lens assembly L2, respectively. A central axis a1 of the first receiving space 141 is parallel to a central axis a2 of the second receiving space 142, and a moving direction of the carrier 140 is parallel to the central axis a1 and the central axis a2. Moreover, the first holder opening 171 is corresponding to the first receiving space 141, and the second holder opening 172 is corresponding to the second receiving space 142.

The coil 150 is disposed around the carrier 140, and surrounds the first receiving space 141 and the second receiving space 142.

The first magnet 130 includes four magnet members 131 which are separated with each other. The four magnet members 131 disposed in the metal yoke 110 are corresponding to the four step portions 113, respectively. Moreover, the four magnet members 131 of the first magnet 130 are corresponding to the coil 150, so that an electromagnetic force between the four magnet members 131 of the first magnet 130 and the coil 150 can be generated.

The first elastic element 120 is assembled on a side of the carrier 140 facing the front end 111 of the metal yoke 110. The first elastic element 120 includes four fixing portions 121, and each of the fixing portions 121 is disposed between one of the step portions 113 and one of the magnet members 131 (shown in FIG. 1F(a)). Furthermore, the first elastic element 120 in the 1st embodiment is formed in a piece shape.

The second elastic element 160 is assembled on another side of the carrier 140 facing the holder 170. FIG. 1K is a top view of the second elastic element 160 shown in FIG. 1A. In FIG. 1K, the second elastic element 160 includes two elastic members, which are a first elastic member 161 and a second elastic member 162. The first elastic member 161 and the second elastic member 162 are electrically separated with each other and are arranged on a same plane. Furthermore, each of the first elastic member 161 and the second elastic member 162 in the 1st embodiment is formed in a piece shape.

The circuit board 180 includes a first image sensor 181 and a second image sensor 182. The first image sensor 181 and the second image sensor 182 are disposed on an image surface of the first lens assembly L1 and an image surface of the second lens assembly L2, respectively. One of the first image sensor 181 and the second image sensor 182 can provide a color image, and the other of the first image sensor 181 and the second image sensor 182 can provide a monochrome image. Alternatively, both of the first image sensor 181 and the second image sensor 182 can provide color images. Alternatively, both of the first image sensor 181 and the second image sensor 182 can provide monochrome images.

Specifically, in a focusing process, an electronic signal is firstly obtained by the dual lens driving apparatus 100 according to lights of an imaged object entering into the first lens assembly L1 and the second lens assembly L2. The electronic signal is then sent to an electronic driver (not shown), and the electronic driver provides a current to the coil 150. An electromagnetic force generated by the interaction of the first magnet 130 and the coil 150 drives the carrier 140 to bring the first lens assembly L1 and the second lens assembly L2 to move along the central axis a1 and the central axis a2, so that the focus functionality of the first lens assembly L1 and the second lens assembly L2 can be achieved. In the above focusing process, when the first lens assembly L1 and the second lens assembly L2 are driven by the carrier 140, a degree of freedom of the first lens assembly L1, the second lens assembly L2 and the carrier 140 along the central axis a1 and the central axis a2 is provided by the first elastic element 120 and the second elastic element 160. The first elastic element 120 and the second elastic element 160 are deformed as the carrier 140 moves, and provide a restoring force to the carrier 140 when the carrier 140 moves back to an initial position thereof.

With the structural arrangement, the first lens assembly L1 and the second lens assembly L2 can be driven simultaneously by the dual lens driving apparatus 100 to capture images. Accordingly, the entire focusing time and electric energy consumption can be reduced. Furthermore, with the first lens assembly L1 and the second lens assembly L2 driven by the dual lens driving apparatus 100, two color images, two monochrome images, or one color image and one monochrome image can be provided, which provide the user a variety of photographing experiences.

Details of the dual lens driving apparatus 100 according to the 1st embodiment are provided hereinafter.

Figure 1I:
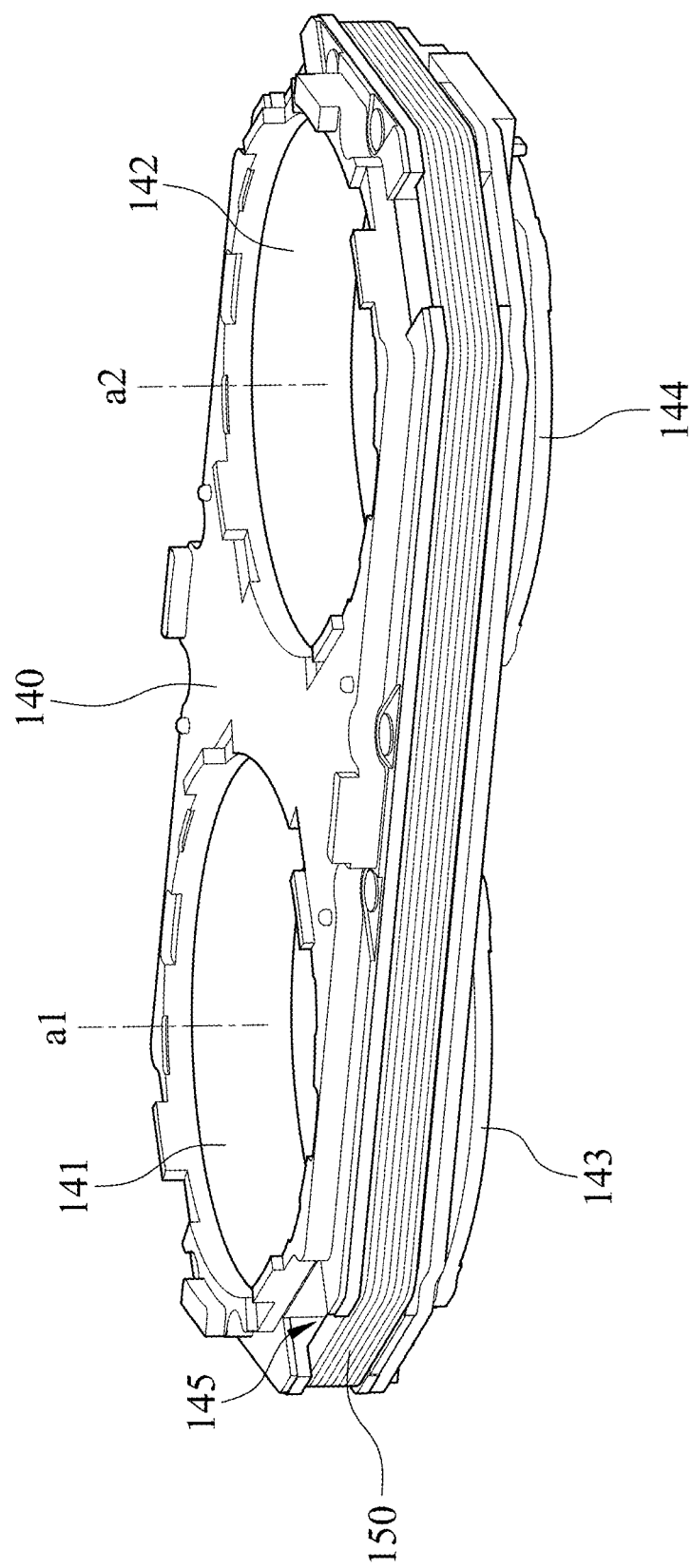
FIG. 1I is a three-dimensional view of a carrier and a coil shown in FIG. 1A in a combination state.
Figure 1J:
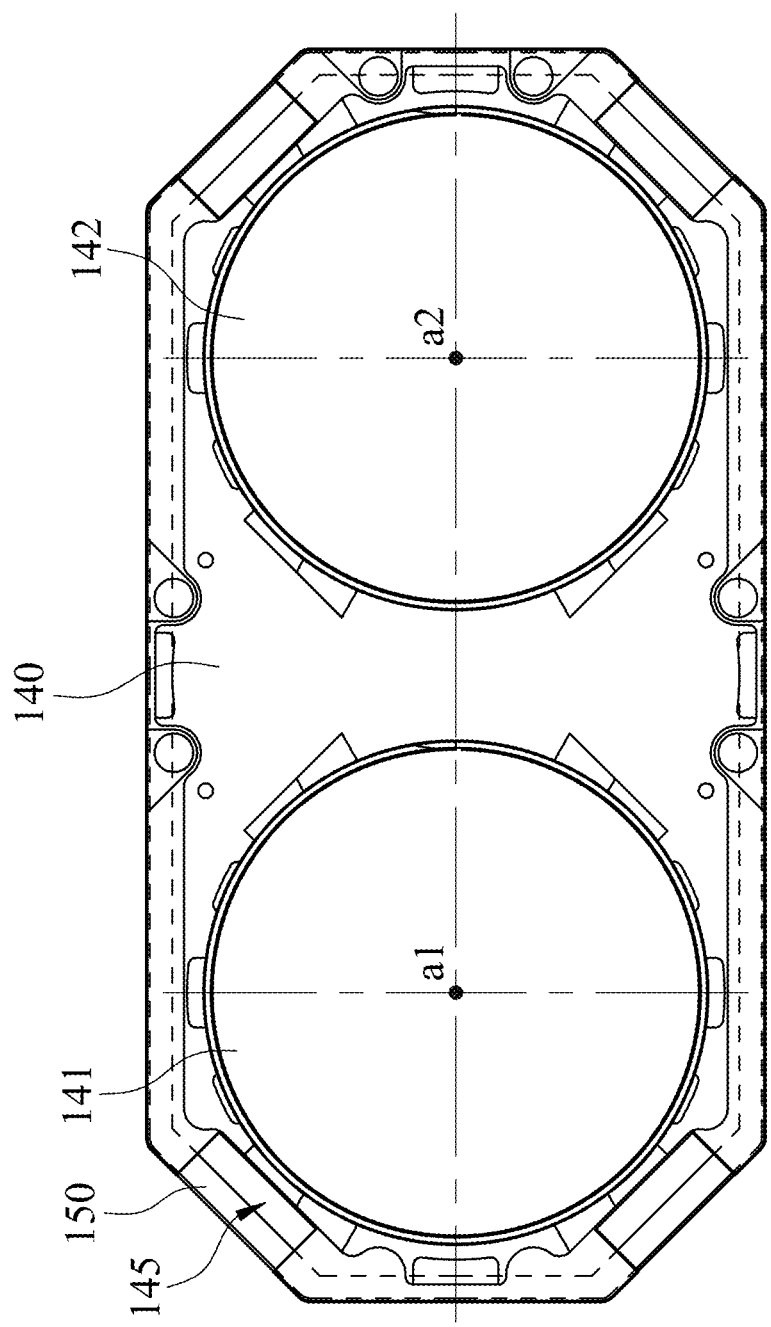
FIG. 1J is a top view of the carrier and the coil shown in FIG. 1I.
Figure 1K:
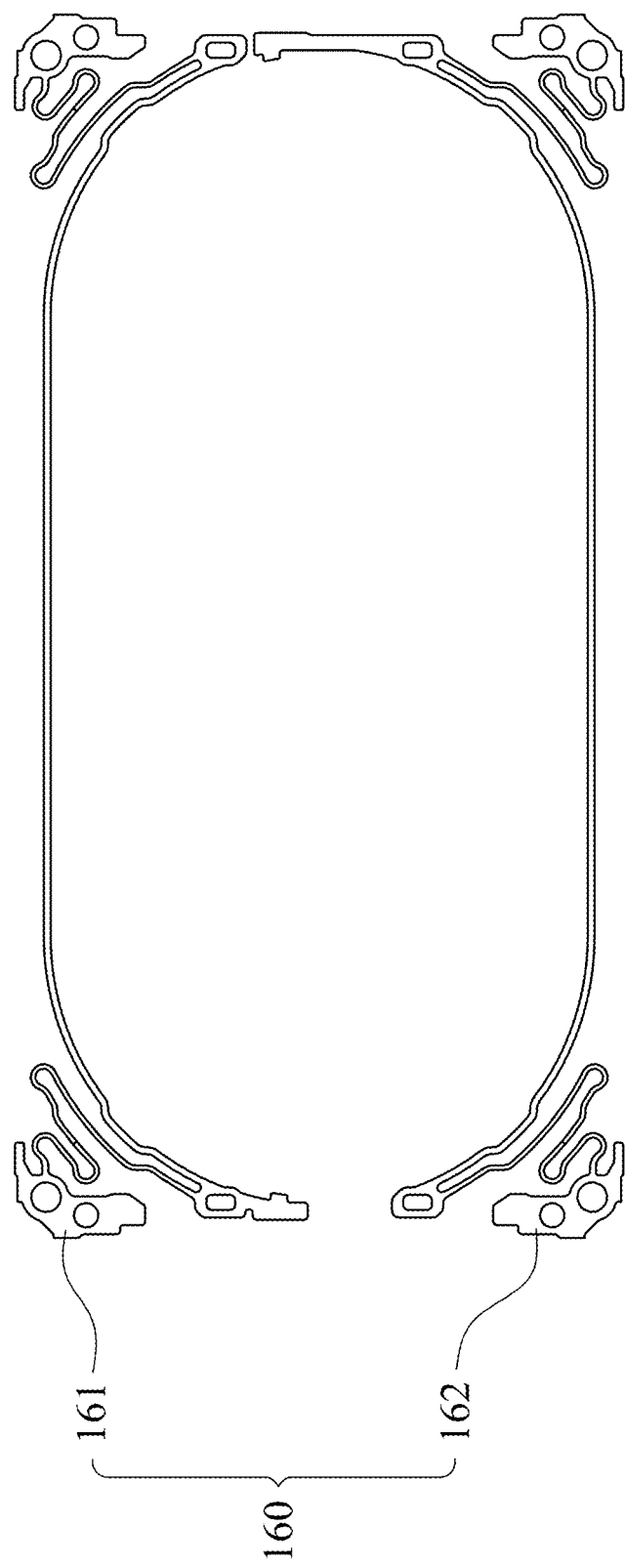
FIG. 1K is a top view of a second elastic element shown in FIG. 1A.
Figure 1L:
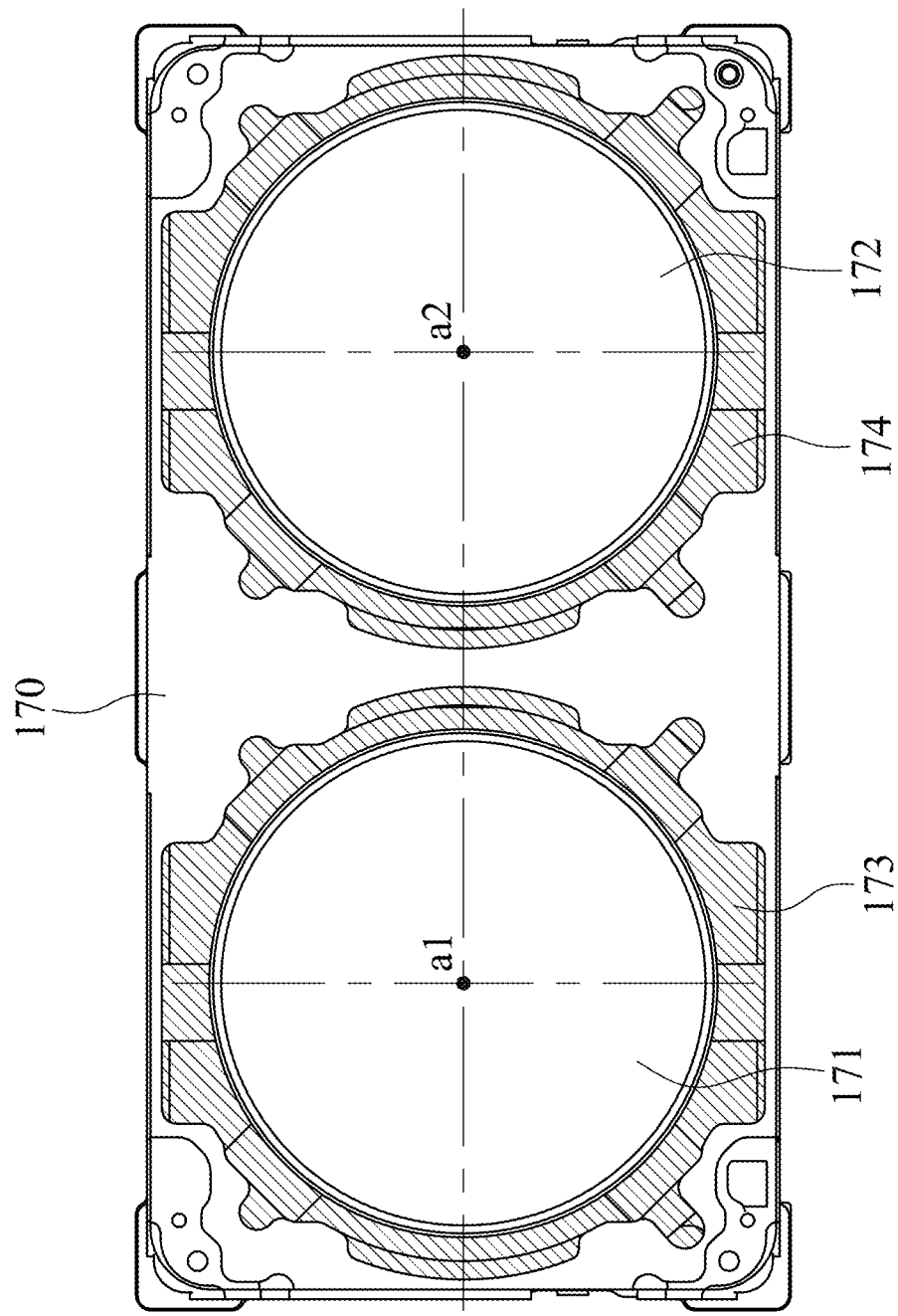
FIG. 1L is a top view of a holder shown in FIG. 1A.

FIG. 1L is a top view of the holder 170 shown in FIG. 1A. In FIG. 1L, the holder 170 further includes two annular grooves, which are a first annular groove 173 and a second annular groove 174. The first annular groove 173 surrounds the first holder opening 171, and the second annular groove 174 surrounds the second holder opening 172. In FIG. 1L, the slash lines in the first annular groove 173 and the second annular groove 174 are intended to clearly designate the first annular groove 173 and the second annular groove 174. Thus, the slash lines are not section lines. With the two annular grooves (173, 174), dusts falling into the first holder opening 171 and the second holder opening 172 during assembling can be prevented, so that the first image sensor 181 and the second image sensor 182 can be released from contamination.

Referring back to FIG. 1B, in the dual lens driving apparatus 100 according to the 1st embodiment, the number of the step portions 113 of the metal yoke 110 is four, and the four step portions 113 are formed on four corners of the front end 111. With the step portions 113, plastic components, such as frames or gaskets for fixing the first magnet 130, can be reduced. Accordingly, the components and the cost can be reduced.

The metal yoke 110 further includes a side wall 116, wherein the side wall 116 is integrally connected with the front end 111. FIG. 1G is a top view of the metal yoke 110 shown in FIG. 1A. As shown In FIGS. 1A and 1*n* FIG. 1G, the side wall 116 includes two side surfaces 116*a* and two side surfaces 116*b*, wherein a length of each of the side surfaces 116*a* is greater than a length of each of the side surfaces 116*b*. When the length of each of the side surfaces 116*a* is L, and the length of each of the side surfaces 116*b* is W, L is not equal to W. In other words, the side wall 116 is composed of a plurality of side surfaces (116*a*, 116*b*) with different lengths. Therefore, the side wall 116 can be manufactured by stamping or laser cutting, which can enhance the production efficiency and can reduce the number of the components of the metal yoke 110.

As shown in FIG. 1G, when a maximum length of the metal yoke 110 parallel to a vertical distance between the central axis a1 of the first receiving space 141 and the central axis a2 of the second receiving space 142 is L (in this embodiment, L also equals the length of the side surface 116*a*), and a maximum width of the metal yoke 110 orthogonal to the vertical distance between the central axis a1 of the first receiving space 141 and the central axis a2 of the second receiving space 142 is W (in this embodiment, W also equals the length of the side surface 116*b*), the following condition can be satisfied: $1.5 < L/W < 4.0$. Therefore, it is favorable to adjust the space arrangement of the dual lens driving apparatus 100 for satisfying the imaging solutions and the overall appearance of the electronic device.

FIG. 1H is a side view of the metal yoke 110 shown in FIG. 1A. As shown in FIG. 1G and FIG. 1H, when the maximum length of the metal yoke 110 parallel to the vertical distance between the central axis a1 of the first receiving space 141 and the central axis a2 of the second receiving space 142 is L, the maximum width of the metal yoke 110 orthogonal to the vertical distance between the central axis a1 of the first receiving space 141 and the central axis a2 of the second receiving space 142 is W, and the level difference between each of the step portions 113 and the plate surface 112 is d, the following condition can be satisfied: $15 < L/d - W/d < 40$. Therefore, it is favorable to reduce the overall height of the dual lens driving apparatus 100.

Referring back to FIG. 1B and FIG. 1E, the metal yoke 110 further includes four elongated portions 118. Two of the four elongated portions 118 are disposed at the front end 111 closing to the first yoke opening 114 (only one elongated portion 118 closing to the first yoke opening 114 is shown in FIG. 1B), the two elongated portions 118 are parallel to the central axis a1 and the central axis a2 and extend toward the first holder opening 171. Two of the four elongated portions 118 are disposed at the front end 111 closing to the second yoke opening 115 (only one elongated portion 118 closing to the second yoke opening 115 is shown in FIG. 1B), the two elongated portions 118 are parallel to the central axis a1 and the central axis a2 and extend toward the second holder opening 172. Each of the elongated portions 118 is corresponding to one magnet member 131. Specifically, there is a partial overlap between each of the elongated portions 118 and its correspondent magnet member 131 along a direction orthogonal to the central axis a1 and the central axis a2. The partial overlap herein refers that when a line of sight travels from the elongated portion 118 to its correspondent magnet member 131 along the direction orthogonal to the central axis a1 and the central axis a2, a portion of the magnet member 131 is shielded by the elongated portion 118. Thus, when the metal yoke 110 is made of a ferromagnetic material, the magnetic flux of the magnet member 131 can be affected by the metal yoke 110, so that the distribution of the magnetic flux of the magnet member 131 can be more concentrated and the direction of the magnetic flux can be more consistent. Accordingly, the efficiency of the interaction between the magnet member 131 and the coil 150 can be enhanced. In other embodiments, the metal yoke 110 can be made of a nonferromagnetic material, which is favorable to separate the affection of the external electromagnetic force and enhance the stability of the dual lens driving apparatus 100.

In the dual lens driving apparatus 100 according to the 1st embodiment, the carrier 140 further includes a first extending structure 143 and a second extending structure 144. The first extending structure 143 is corresponding to the first receiving space 141 and extends from the first receiving space 141 to the first holder opening 171 of the holder 170. The second extending structure 144 is corresponding to the second receiving space 142 and extends from the second receiving space 142 to the second holder opening 172 of the holder 170. Therefore, when the carrier 140 is manufactured by injection molding, it is favorable to modify the draft angle. Accordingly, the carrier 140 is suitable for mass production and the quality stability can be maintained. In the 1st embodiment, each of the first extending structure 143 and the second extending structure 144 is formed in a ring shape. In other embodiments, each of the first extending structure 143 and the second extending structure 144 can be, but is not limited to, composed of two half rings which are separated with each other. As shown in FIG. 1F(c), the first extending structure 143 is corresponding to the first annular groove 173. The second extending structure 144 is corresponding to the second annular groove 174 in a similar manner. Therefore, a first anti-distortion structure is formed. The first elastic element 120 and the second elastic element 160 can be released from being distorted during assembling the first lens assembly L1, the second lens assembly L2 and the carrier 140.

Please refer to FIG. 1F(b), FIG. 1I and FIG. 1J simultaneously. FIG. 1I is a three-dimensional view of the carrier 140 and the coil 150 shown in FIG. 1A in a combination state. FIG. 1J is a top view of the carrier 140 and the coil 150 shown in FIG. 1I. In FIG. 1J, the portion of the coil 150 shielded by the carrier 140 is depicted with dash lines. A separated space 145 is between the coil 150 and the carrier 140. As shown in FIG. 1F(b), the separated space 145 includes a vertical zone 145a and a horizontal zone 145b. The vertical zone 145a is between the carrier 140 and an inner side 151 of the coil 150. The horizontal zone 145b is between the carrier 140 and a bottom side 152 of the coil 150. The inner side 151 of the coil 150 refers to a side of the coil 150 facing the first receiving space 141 and the second receiving space 142. The bottom side 152 of the coil 150 refers to a side of the coil 150 facing the holder 170. A width of the separated space 145 is S, which refers to a width of the vertical zone 145a. In FIG. 1F(b), the dash line is an auxiliary for distinguishing the vertical zone 145a and the horizontal zone 145b. That is, the dash line is an imaginary line and does not actually exist. With the separated space 145, a distance between the coil 150 and the first magnet 130 is adjustable. As shown in FIG. 1F(b), when S is greater, the distance between the coil 150 and the magnet member 131 of the first magnet 130 is shorter. In this case, the magnetic flux sensing by the coil 150 is stronger. When the coil 150 is supplied with electricity, the Lorentz force generated by the interaction between the coil 150 and the magnetic flux can be increased. Accordingly, the efficiency for simultaneously moving the first lens assembly L1 and the second lens assembly L2 can be enhanced.

In FIG. 1F(b), the elongated portions 118 of the metal yoke 110 extend into the vertical zone 145a of the separated space 145. Therefore, the used space of the dual lens driving apparatus 100 can be reduced. Furthermore, a second anti-distortion structure can be formed by the elongated portions 118 and the carrier 140. The second anti-distortion structure can further protect the first elastic element 120 and the second elastic element 160 from being distorted.

In FIG. 1F(b), when the width of the separated space 145 is S, the following condition can be satisfied: 0.08 mm<S<1.6 mm. Therefore, the magnetic flux density is proper.

In FIG. 1F(b), the horizontal zone 145b is between the carrier 140 and the bottom side 152 of the coil 150. In other words, the horizontal zone 145b of the separated space 145 is corresponding to the side of the coil 150 facing the holder 170. Specifically, there is a partial overlap between each of the separated space 145 and the coil 150 along a direction parallel to the central axis a1 and the central axis a2. The partial overlap herein refers that when a line of sight travels from the coil 150 to the separated space 145 along the direction parallel to the central axis a1 and the central axis a2, a portion of the separated space 145 (i.e., the horizontal zone 145b) is shielded by the coil 150. Therefore, it is favorable to adjust the relative position between the coil 150 and the first magnet 130 for enhancing the efficiency of electromagnetic interaction.

The values of L, W, d, S, L/W, and L/d−W/d of the 1st embodiment are listed in Table 1.

TABLE 1

| L | W | d |
|---|---|---|
| 16.7 mm | 8.5 mm | 0.45 mm |
| S | L/W | L/d − W/d |
| 0.28 mm | 1.96 | 18.22 |

2nd Embodiment

Figure 2A:
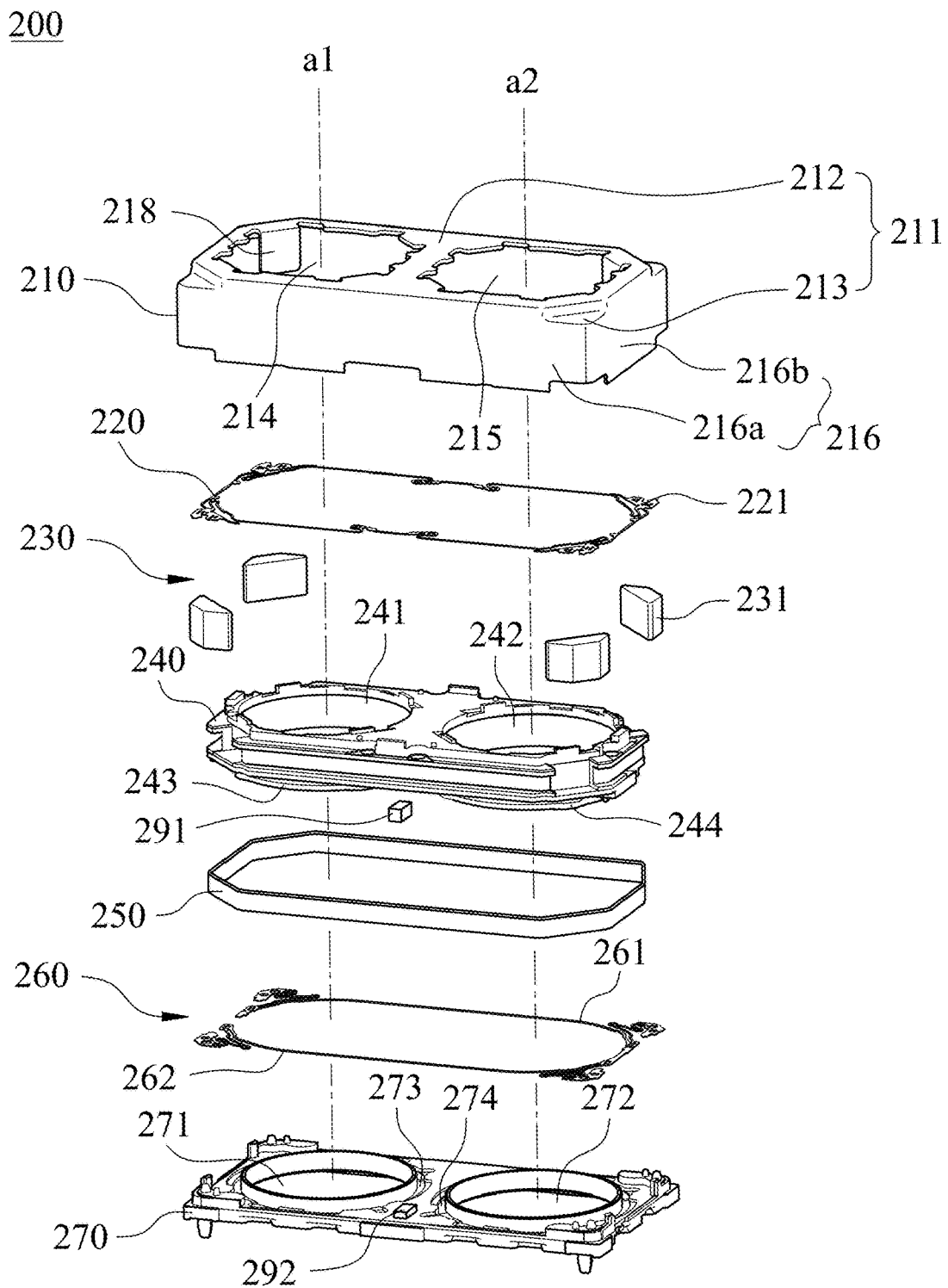
FIG. 2A is an exploded view of a dual lens driving apparatus according to the 2nd embodiment of the present disclosure.

FIG. 2A is an exploded view of a dual lens driving apparatus 200 according to the 2nd embodiment of the present disclosure. In FIG. 2A, the dual lens driving apparatus 200 includes a metal yoke 210, a first elastic element 220, a first magnet 230, a carrier 240, a second magnet 291, a coil 250, a second elastic element 260, a sensor element 292 and a holder 270. The metal yoke 210 is corresponding to the holder 270 so as to form an accommodating space (its reference numeral is omitted). The first elastic element 220, the first magnet 230, the carrier 240, the second magnet 291, the coil 250, the second elastic element 260 and the sensor element 292 are disposed in the metal yoke 210. Specifically, the first elastic element 220, the first magnet 230, the carrier 240, the second magnet 291, the coil 250, the second elastic element 260 and the sensor element 292 are disposed in the accommodating space formed by the metal yoke 210 and the holder 270.

Figure 2B:
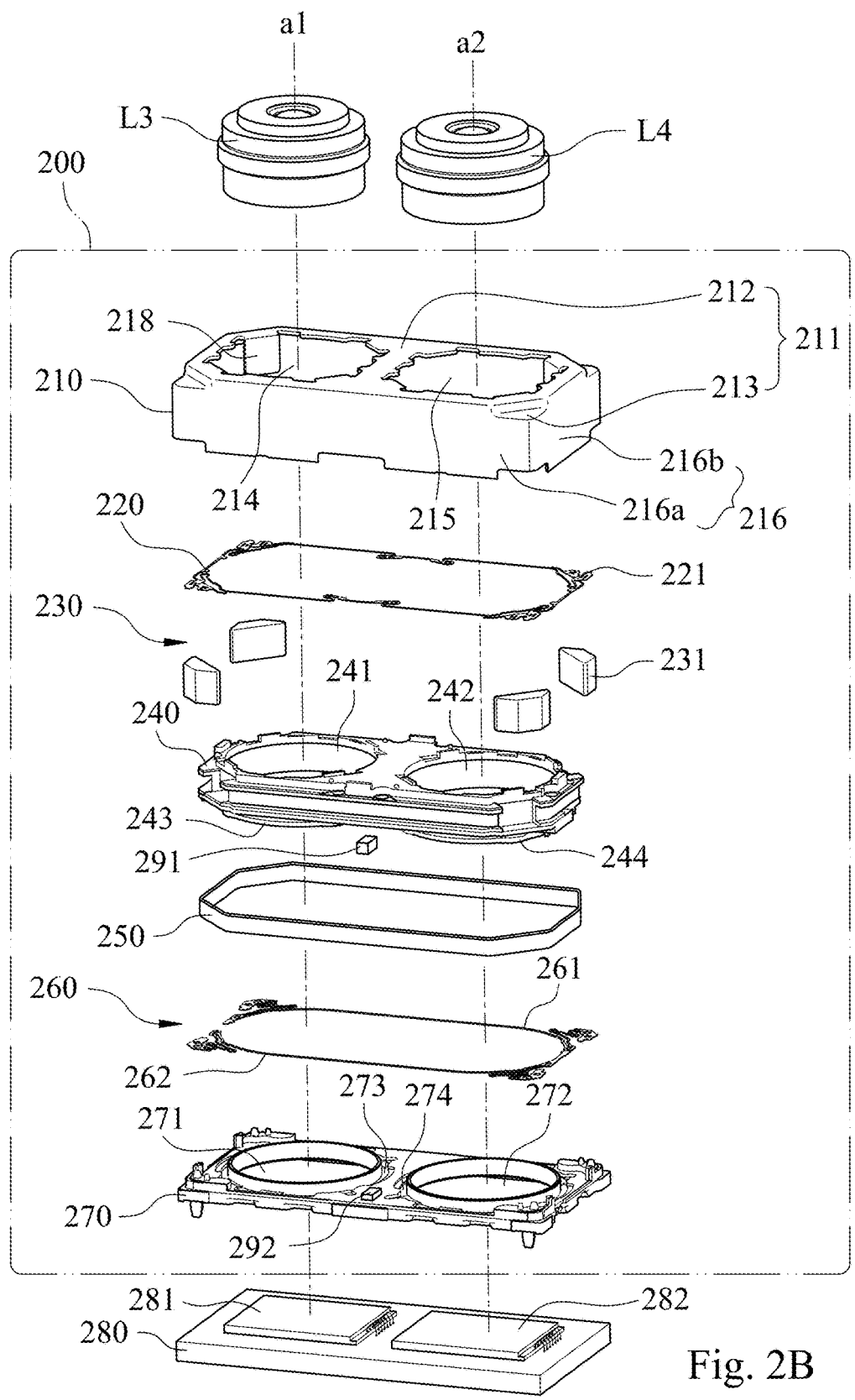
FIG. 2B is an exploded view of the dual lens driving apparatus shown in FIG. 2A, a first lens assembly, a second lens assembly and a circuit board.
Figure 2C:
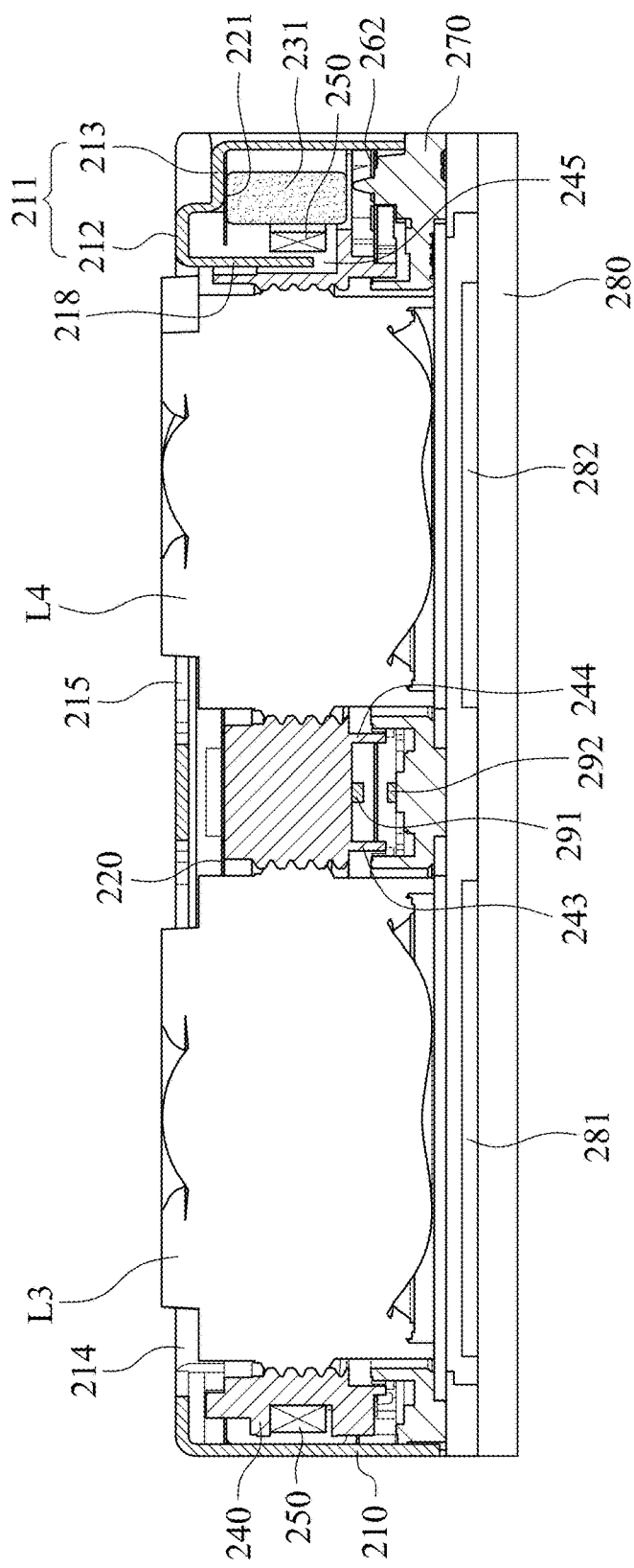
FIG. 2C is a cross-sectional view of the dual lens driving apparatus, the first lens assembly, the second lens assembly and the circuit board shown in FIG. 2B in a combination state.

FIG. 2B is an exploded view of the dual lens driving apparatus 200 shown in FIG. 2A, a first lens assembly L3, a second lens assembly L4 and a circuit board 280. FIG. 2C is a cross-sectional view of the dual lens driving apparatus 200, the first lens assembly L3, the second lens assembly L4 and the circuit board 280 in FIG. 2B in a combination state. The view angle of FIG. 2C is the same as that of FIG. 1E. As shown in FIGS. 2B and 2C, the dual lens driving apparatus 200 is configured to drive the first lens assembly L3 and the second lens assembly L4.

In the dual lens driving apparatus 200 according to the 2nd embodiment, the holder 270 includes two holder openings, which are a first holder opening 271 and a second holder opening 272. The holder 270 further includes two annular grooves, which are a first annular groove 273 and a second annular groove 274. The first annular groove 273 surrounds the first holder opening 271, and the second annular groove 274 surrounds the second holder opening 272.

The metal yoke 210 is corresponding to the holder 270. The metal yoke 210 can be connected to the holder 270 via coupling. The metal yoke 210 includes a front end 211. The front end 211 includes a plate surface 212 and four step portions 213. The four step portions 213 are formed on four corners of the front end 211. A level difference is between each of the step portions 213 and the plate surface 212. The plate surface 212 includes two yoke openings, which are a first yoke opening 214 and a second yoke opening 215. The first yoke opening 214 is corresponding to the first holder opening 271, and the second yoke opening 215 is corresponding to the second holder opening 272. The metal yoke 210 further includes a side wall 216, wherein the side wall 216 is integrally connected with the front end 211. Furthermore, the side wall 216 is composed of a plurality of side surfaces (216a, 216b) with different lengths. The metal yoke 210 further includes four elongated portions 218. Two of the four elongated portions 218 are disposed at the front end 211 closing to the first yoke opening 214 (only one elongated portion 218 closing to the first yoke opening 214 is shown in FIG. 2B); the two elongated portions 218 are parallel to a central axis a1 and a central axis a2 and extend toward the first holder opening 271. Two of the four elongated portions 218 are disposed at the front end 211 closing to the second yoke opening 215 (only one elongated portion 218 closing to the second yoke opening 215 is shown in FIG. 2B); the two elongated portions 218 are parallel to the central axis a1 and the central axis a2 and extend toward the second holder opening 272. Each of the elongated portions 218 is corresponding to one magnet member 231.

The carrier 240 is movably disposed in the metal yoke 210. The carrier 240 includes a first receiving space 241 and a second receiving space 242 for receiving the first lens assembly L3 and the second lens assembly L4, respectively. The central axis a1 of the first receiving space 241 is parallel to the central axis a2 of the second receiving space 242, and a moving direction of the carrier 240 is parallel to the central axis a1 and the central axis a2. Moreover, the first holder opening 271 is corresponding to the first receiving space 241, and the second holder opening 272 is corresponding to the second receiving space 242. The carrier 240 further includes a first extending structure 243 and a second extending structure 244. The first extending structure 243 is corresponding to the first receiving space 241 and extends from the first receiving space 241 to the first holder opening 271 of the holder 270, and the first extending structure 243 is corresponding to the first annular groove 273. The second extending structure 244 is corresponding to the second receiving space 242 and extends from the second receiving space 242 to the second holder opening 272 of the holder 270, and the second extending structure 244 is corresponding to second annular groove 274.

The coil 250 is disposed around the carrier 240, and surrounds the first receiving space 241 and the second receiving space 242.

The first magnet 230 includes four magnet members 231 which are separated with each other. The four magnet members 231 disposed in the metal yoke 210 are corresponding to the four step portions 213, respectively. Moreover, the four magnet members 231 of the first magnet 230 are corresponding to the coil 250.

The first elastic element 220 is assembled on a side of the carrier 240 facing the front end 211 of the metal yoke 210. The first elastic element 220 includes four fixing portions 221, and each of the fixing portions 221 is disposed between one of the step portions 213 and one of the magnet members 231.

The second elastic element 260 is assembled on another side of the carrier 240 facing the holder 270. The second elastic element 260 includes two elastic members, which are a first elastic member 261 and a second elastic member 262. The first elastic member 261 and the second elastic member 262 are electrically separated with each other and are arranged on a same plane.

As shown in FIG. 2C, a separated space 245 is between the coil 250 and the carrier 240, and a distance between the coil 250 and the first magnet 230 is adjustable. The elongated portions 218 of the metal yoke 210 extend into the separated space 245. Furthermore, the separated space 245 is corresponding to a side of the coil 250 facing the holder 270.

The second magnet 291 is disposed on the side of the carrier 240 facing the holder 270, and the sensor element 292 is corresponding to the second magnet 291. In the 2nd embodiment, the sensor element 292 is disposed on the holder 270. The sensor element 292 is for detecting the change of the magnetic field of the second magnet 291, and the sensor element 292 can be a Hall sensor. During the focusing process of the first lens assembly L3 and the second lens assembly L4, the second magnet 291 is driven by the carrier 240 to move along a direction parallel to the central axis a1 and the central axis a2. As a result, a change of the magnetic field between the second magnet 291 and the sensor element 292 is generated, and the change of the magnetic field is detected by the sensor element 292. The sensor element 292 provides an electronic signal corresponding to the position of the first lens assembly L3 and the second lens assembly L4 to the electronic driver (not shown), so that the electronic driver can adjust the current provided to the coil 250, which allows the first lens assembly L3 and the second lens assembly L4 to move to a predetermined position without moving back to an initial position thereof. Accordingly, the entire focusing time can be significantly reduced. Particularly, the sensor element 292 is for detecting the amount of movement along the direction parallel to the central axis a1 and the central axis a2, and is not for detecting the amount of movement along the direction orthogonal to the central axis a1 and the central axis a2.

The circuit board 280 includes a first image sensor 281 and a second mage sensor 282. The first image sensor 281 and the second image sensor 282 are disposed on an image surface of the first lens assembly L3 and an image surface of the second lens assembly L4, respectively.

The values of L, W, d, S, L/W, and L/d−W/d of the 2nd embodiment are listed in Table 2.

TABLE 2

| L | W | d |
|---|---|---|
| 16.7 mm | 8.5 mm | 0.45 mm |
| S | L/W | L/d − W/d |
| 0.28 mm | 1.96 | 18.22 |

The other details of the dual lens driving apparatus 200 according to the 2nd embodiment can be the same as that of the dual lens driving apparatus 100 according to the 1st embodiment, and are not repeated herein.

3rd Embodiment

Figure 3A:
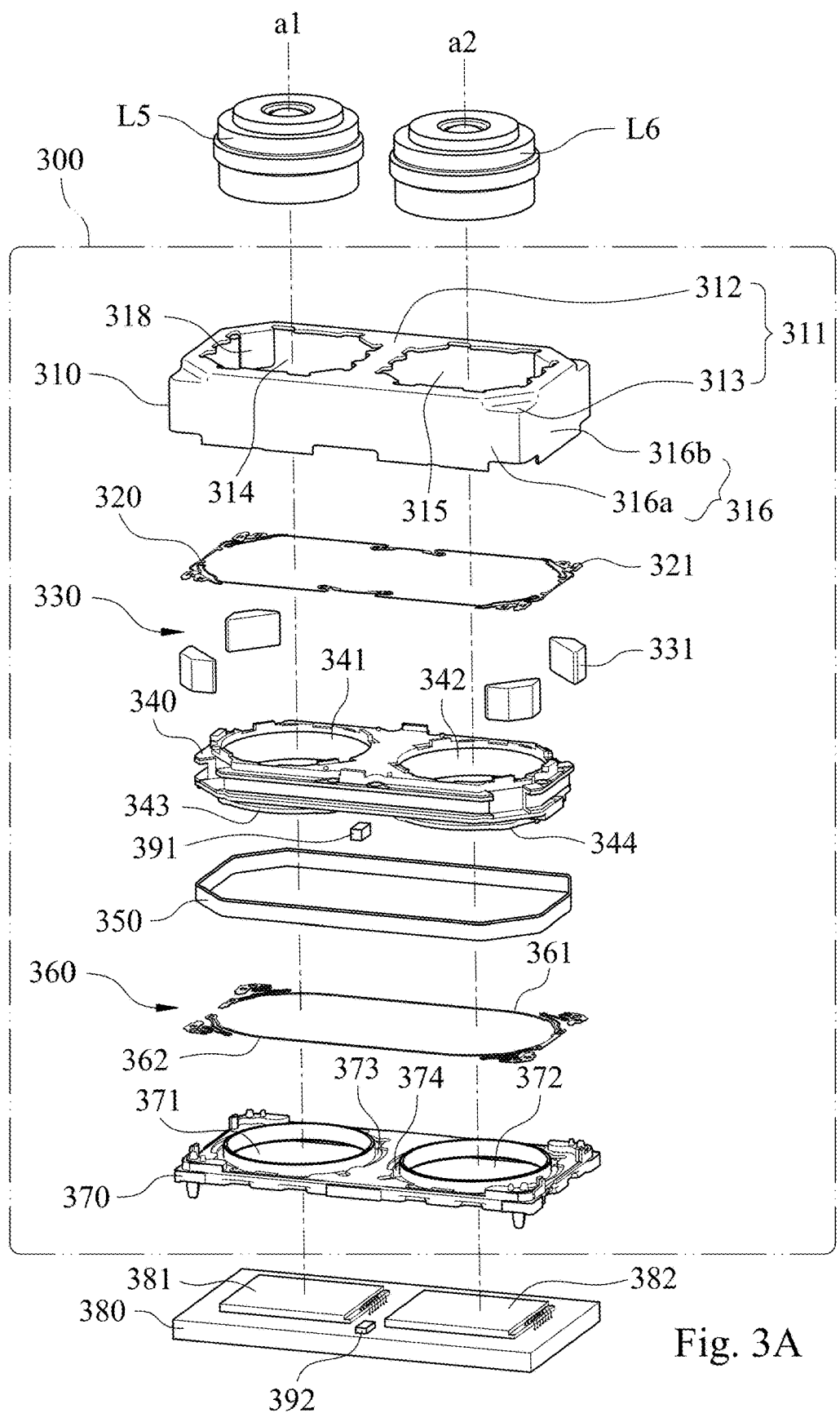
FIG. 3A is an exploded view of a dual lens driving apparatus according to the 3rd embodiment of the present disclosure, a first lens assembly, a second lens assembly and a circuit board.
Figure 3B:
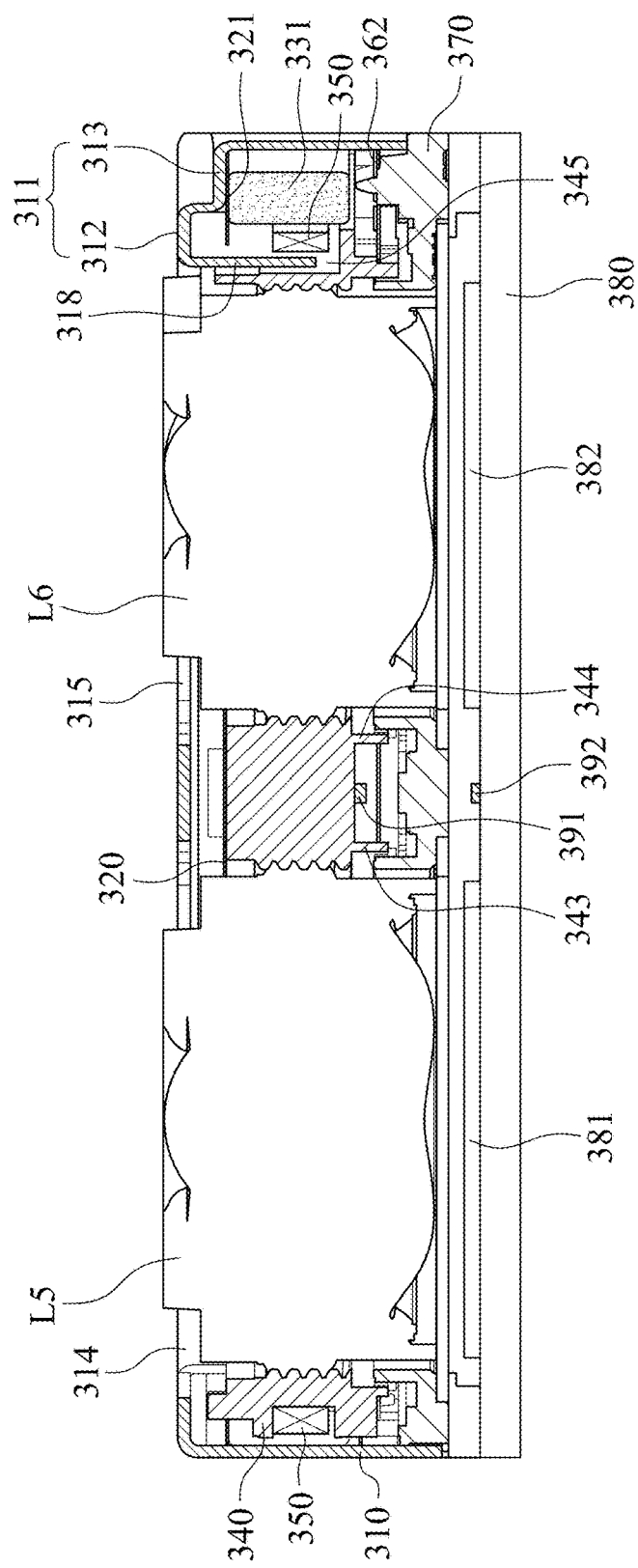
FIG. 3B is a cross-sectional view of the dual lens driving apparatus, the first lens assembly, the second lens assembly and the circuit board shown in FIG. 3A in a combination state.

FIG. 3A is an exploded view of a dual lens driving apparatus 300 according to the 3rd embodiment of the present disclosure, a first lens assembly L5, a second lens assembly L6 and a circuit board 380. FIG. 3B is a cross-sectional view of the dual lens driving apparatus 300, the first lens assembly L5, the second lens assembly L6 and the circuit board 380 shown in FIG. 3A in a combination state. The view angle of FIG. 3B is the same as that of FIG. 1E. In FIG. 3A and FIG. 3B, the dual lens driving apparatus 300 includes a metal yoke 310, a first elastic element 320, a first magnet 330, a carrier 340, a second magnet 391, a coil 350, a second elastic element 360, a holder 370 and a sensor element 392. The metal yoke 310 is corresponding to the holder 370 so as to form an accommodating space (its reference numeral is omitted). The first elastic element 320, the first magnet 330, the carrier 340, the second magnet 391, the coil 350 and the second elastic element 360 are disposed in the metal yoke 310. Specifically, the first elastic element 320, the first magnet 330, the carrier 340, the second magnet 391, the coil 350 and the second elastic element 360 are disposed in the accommodating space formed by the metal yoke 310 and the holder 370. The dual lens driving apparatus 300 is configured to drive the first lens assembly L5 and the second lens assembly L6.

In the dual lens driving apparatus 300 according to the 3rd embodiment, the holder 370 includes two holder openings, which are a first holder opening 371 and a second holder opening 372. The holder 370 further includes two annular grooves, which are a first annular groove 373 and a second annular groove 374. The first annular groove 373 surrounds the first holder opening 371, and the second annular groove 374 surrounds the second holder opening 372.

The metal yoke 310 is corresponding to the holder 370. The metal yoke 310 can be connected to the holder 370 via coupling. The metal yoke 310 includes a front end 311. The front end 311 includes a plate surface 312 and four step portions 313. The four step portions 313 are formed on four corners of the front end 311. A level difference is between each of the step portions 313 and the plate surface 312. The plate surface 312 includes two yoke openings, which are a first yoke opening 314 and a second yoke opening 315. The first yoke opening 314 is corresponding to the first holder opening 371, and the second yoke opening 315 is corresponding to the second holder opening 372. The metal yoke 310 further includes a side wall 316, wherein the side wall 316 is integrally connected with the front end 311. Furthermore, the side wall 316 is composed of a plurality of side surfaces (316a, 316b) with different lengths. The metal yoke 310 further includes four elongated portions 318. Two of the four elongated portions 318 are disposed at the front end 311 closing to the first yoke opening 314 (only one elongated portion 318 closing to the first yoke opening 314 is shown in FIG. 3A); the two elongated portions 318 are parallel to a central axis a1 and a central axis a2 and extend toward the first holder opening 371. Two of the four elongated portions 318 are disposed at the front end 311 closing to the second yoke opening 315 (only one elongated portion 318 closing to the second yoke opening 315 is shown in FIG. 3A); the two elongated portions 318 are parallel to the central axis a1 and the central axis a2 and extend toward the second holder opening 372. Each of the elongated portions 318 is corresponding to one magnet member 331.

The carrier 340 is movably disposed in the metal yoke 310. The carrier 340 includes a first receiving space 341 and a second receiving space 342 for receiving the first lens assembly L5 and the second lens assembly L6, respectively. The central axis a1 of the first receiving space 341 is parallel to the central axis a2 of the second receiving space 342, and a moving direction of the carrier 340 is parallel to the central axis a1 and the central axis a2. Moreover, the first holder opening 371 is corresponding to the first receiving space 341, and the second holder opening 372 is corresponding to the second receiving space 342. The carrier 340 further includes a first extending structure 343 and a second extending structure 344. The first extending structure 343 is corresponding to the first receiving space 341 and extends from the first receiving space 341 to the first holder opening 371 of the holder 370, and the first extending structure 343 is corresponding to the first annular groove 373. The second extending structure 344 is corresponding to the second receiving space 342 and extends from the second receiving space 342 to the second holder opening 372 of the holder 370, and the second extending structure 344 is corresponding to second annular groove 374.

The coil 350 is disposed around the carrier 340, and surrounds the first receiving space 341 and the second receiving space 342.

The first magnet 330 includes four magnet members 331 which are separated with each other. The four magnet members 331 disposed in the metal yoke 310 are corresponding to the four step portions 313, respectively. Moreover, the four magnet members 331 of the first magnet 330 are corresponding to the coil 350.

The first elastic element 320 is assembled on a side of the carrier 340 facing the front end 311 of the metal yoke 310. The first elastic element 320 includes four fixing portions 321, and each of the fixing portions 321 is disposed between one of the step portions 313 and one of the magnet members 331.

The second elastic element 360 is assembled on another side of the carrier 340 facing the holder 370. The second elastic element 360 includes two elastic members, which are a first elastic member 361 and a second elastic member 362. The first elastic member 361 and the second elastic member 362 are electrically separated with each other and are arranged on a same plane.

As shown in FIG. 3B, a separated space 345 is between the coil 350 and the carrier 340, and a distance between the coil 350 and the first magnet 330 is adjustable. The elongated portions 318 of the metal yoke 310 extend into the separated space 345. Furthermore, the separated space 345 is corresponding to a side of the coil 350 facing the holder 370.

The second magnet 391 is disposed on the side of the carrier 340 facing the holder 370, and the sensor element 392 is corresponding to the second magnet 391. In the 3rd embodiment, the sensor element 392 is disposed on the circuit board 380. The sensor element 392 is for detecting the change of the magnetic field of the second magnet 391, and the sensor element 392 can be a Hall sensor. The circuit board 380 includes a first image sensor 381 and a second image sensor 382. The first image sensor 381 and the second image sensor 382 are disposed on an image surface of the first lens assembly L5 and an image surface of the second lens assembly L6, respectively.

The values of L, W, d, S, L/W, and L/d−W/d of the 3rd embodiment are listed in Table 3.

TABLE 3

| L | W | d |
|---|---|---|
| 16.7 mm | 8.5 mm | 0.45 mm |
| S | L/W | L/d − W/d |
| 0.28 mm | 1.96 | 18.22 |

The other details of the dual lens driving apparatus 300 according to the 3rd embodiment can be the same as that of the dual lens driving apparatus 100 according to the 1st embodiment, and are not repeated herein.

4th Embodiment

Figure 4A:
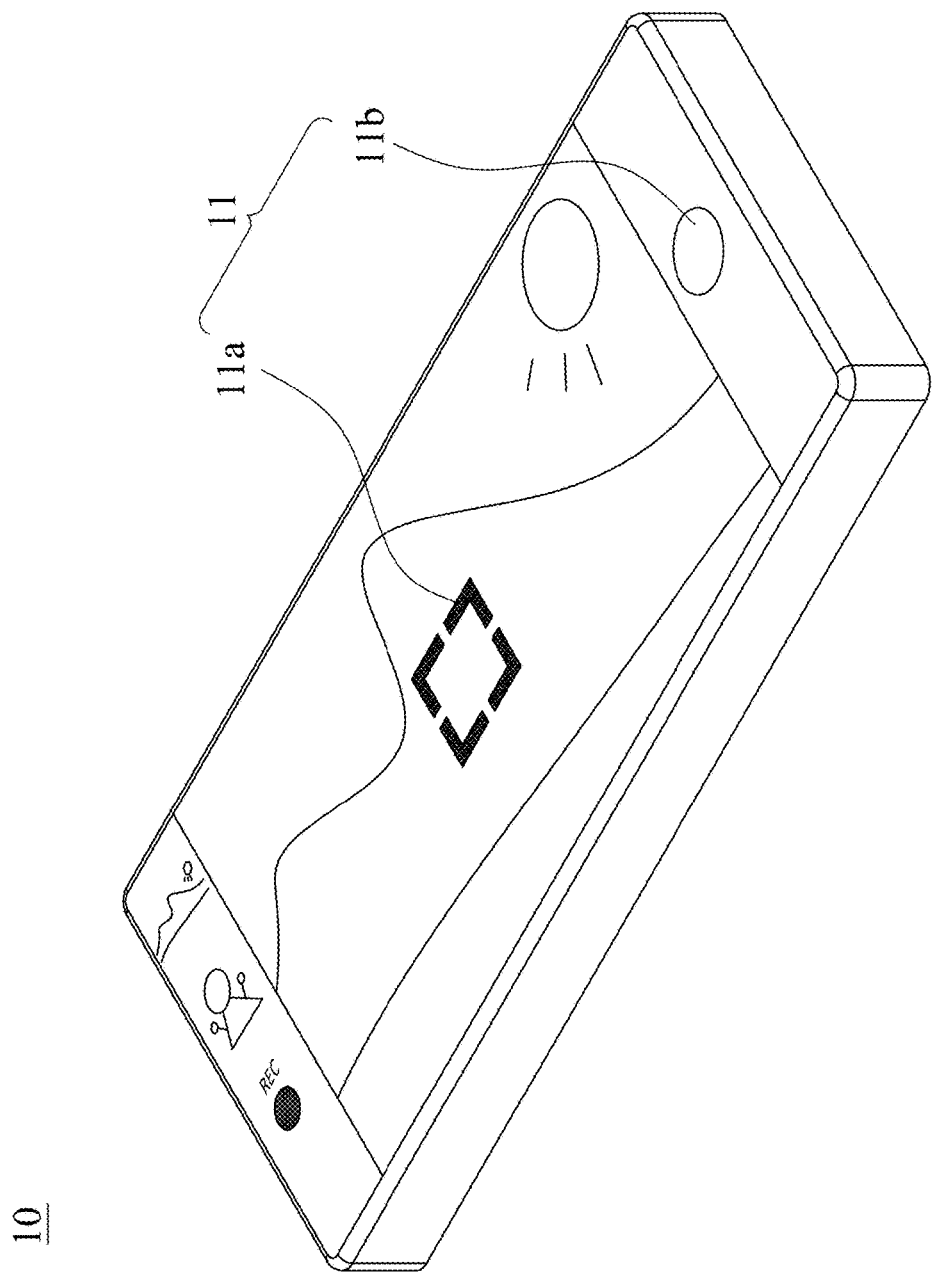
FIG. 4A is a schematic view of an electronic device according to the 4th embodiment of the present disclosure.
Figure 4B:
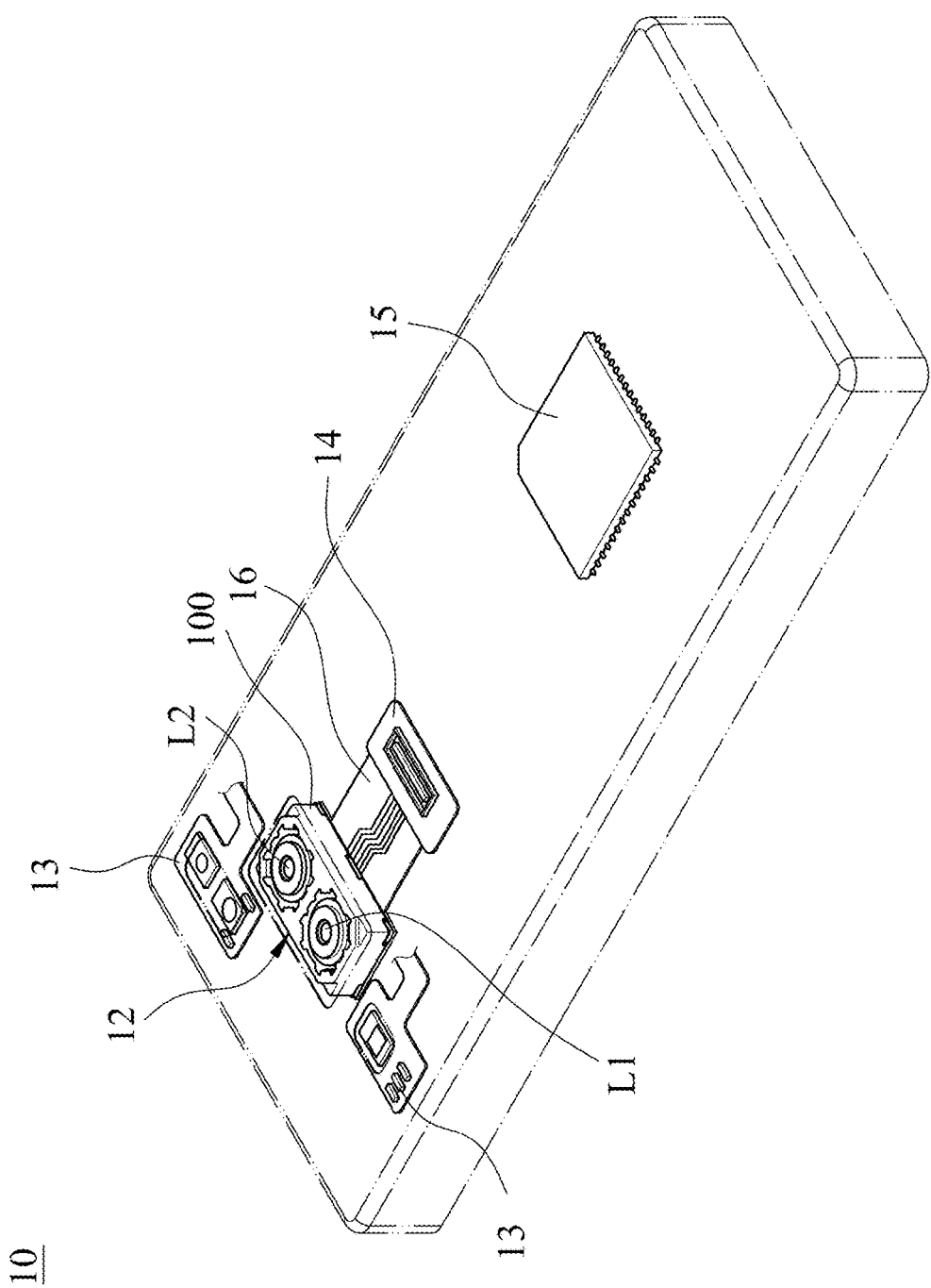
FIG. 4B is a perspective schematic view of the electronic device shown in FIG. 4A from another view angle.
Figure 4C:
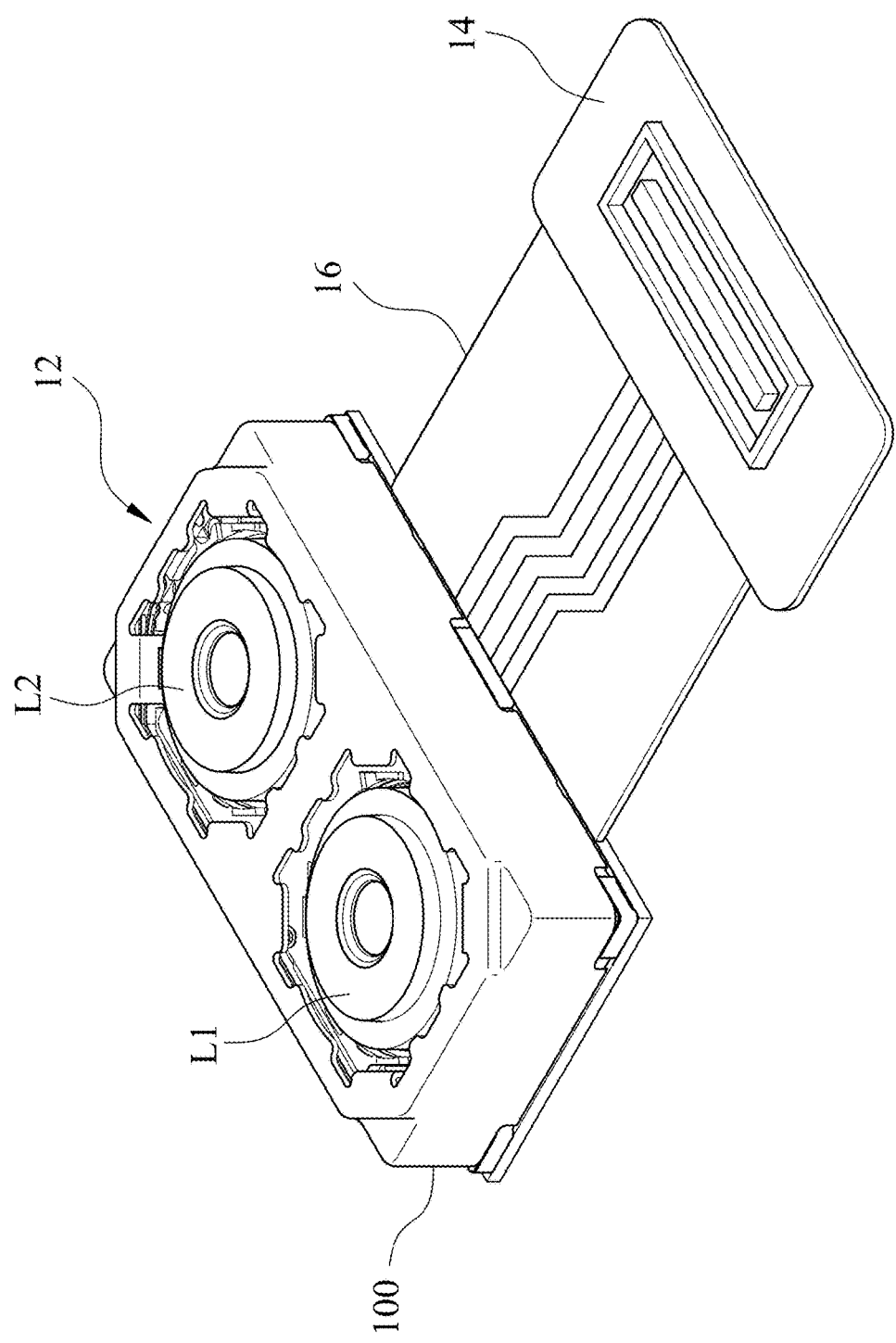
FIG. 4C is a schematic view showing a dual lens module in FIG. 4B connected with a connector.
Figure 4D:
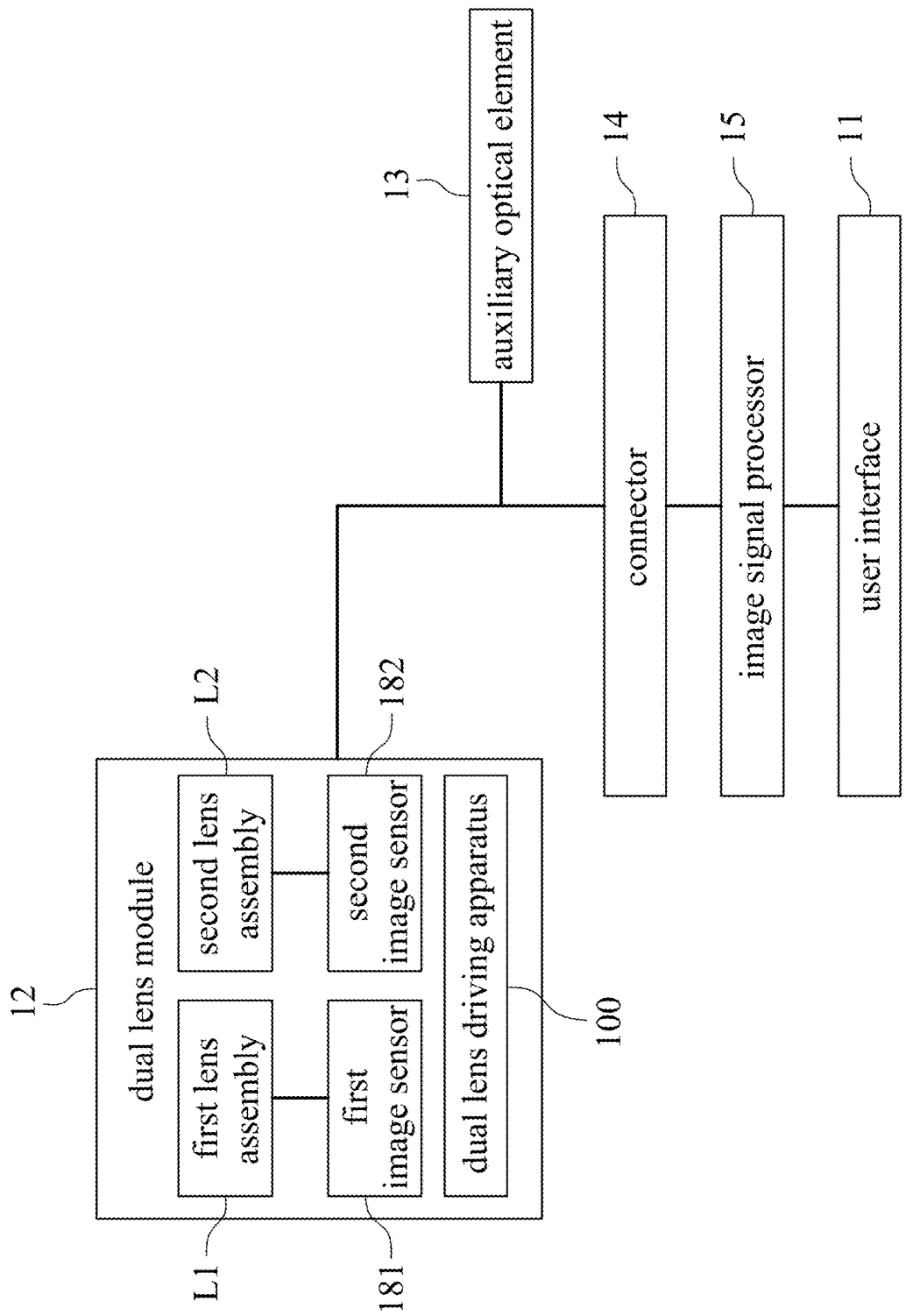
FIG. 4D is a block diagram of the electronic device shown in FIG. 4A.

FIG. 4A is a schematic view of an electronic device 10 according to the 4th embodiment of the present disclosure. FIG. 4B is a perspective schematic view of the electronic device 10 shown in FIG. 4A from another view angle. FIG. 4C is a schematic view showing a dual lens module 12 in FIG. 4B connected with a connector 14. FIG. 4D is a block diagram of the electronic device 10 shown in FIG. 4A. In FIG. 4A to FIG. 4D, the electronic device 10 of the 4th embodiment is a smartphone. The electronic device 10 includes a user interface 11, the dual lens module 12, at least two auxiliary optical elements 13, the connector 14 and an image signal processor (ISP) 15. As shown in FIG. 4D, the dual lens module 12, the auxiliary optical elements 13 and the image signal processor 15 are all electrically connected with the connector 14. The connector 14 is applied to integrate the circuit. FIG. 4C exemplarily shows that the dual lens module 12 and the connector 14 can be connected via a conductor circuit 16, such as a flexible printed circuit board (FPC). Other conductor circuits for connecting the auxiliary optical elements 13, the image signal processor 15, the user interface 11 and the connector 14 are not the key point of the present disclosure and are omitted. With the dual lens module 12 and the relevant elements (such as the auxiliary optical elements 13) arranged separately and connected via conductor circuits, the freedom of degree for designing the mechanism space of the electronic device 10 can be enhanced, which is favorable for lightening and thinning the electronic device 10. In other embodiments (not shown), the dual lens module 12 and the relevant elements can be disposed on a mainboard of the electronic device 10 or other support board in any form according to the demands of mechanism design and circuit layout.

Specifically, the user interface 11 includes a touch screen 11a and a button 11b. A user can see the image captured by the electronic device 10 via the touch screen 11a and can manually select the shooting scope via the touch screen 11a, so that auto-focus functionality of "what you see is what you get" can be achieved. The dual lens module 12 includes the dual lens driving apparatus 100 according to the 1st embodiment, the first lens assembly L1, the second assembly L2, the first image sensor 181 (shown in FIG. 1B) and the second image sensor 182 (shown in FIG. 1B). The first lens assembly L1 is disposed in the first receiving space 141 (shown in FIG. 1B) of the dual lens driving apparatus 100, and the second lens assembly L2 is disposed in the second receiving space 142 (shown in FIG. 1B) of the dual lens driving apparatus 100. The first image sensor 181 is disposed on an image surface (not shown) of the first lens assembly L1, and the second lens assembly L2 is disposed on an image surface (not shown) of the second lens assembly L2. In the 4th embodiment, the first image sensor 181 is for providing a color image, and the second image sensor 182 is for providing a monochrome image. The dual lens driving apparatus 100 can drive the first lens assembly L1 and the second lens assembly L2 simultaneously. Accordingly, the electronic device 10 can capture two images at the same time. The auxiliary optical elements 13 can be selected from a flash module for compensating the color, an infrared distancer or a laser focusing module. Therefore, the image quality of the electronic device 10 can be enhanced, and the electronic device 10 can provide different modes of shooting, such as optimized self-timer, high dynamic range under low light condition and record with 4K resolution. Furthermore, the electronic device 10 can further include, but is not limited to, a wireless communication unit, a control unit, a storage unit, a random access memory unit (RAM), a read-only memory unit (ROM) or a combination thereof.

When a user shoots with the electronic device 10, the user can activate the shooting via the touch screen 11a or the button 11b. When the shooting is activated, lights of the imaged object are focused by the first lens assembly L1 and the second lens assembly L2 on the first image sensor 181 and the second image sensor 182, then electronic signals related to the images are delivered to the image signal processor 15.

Figure 4E:
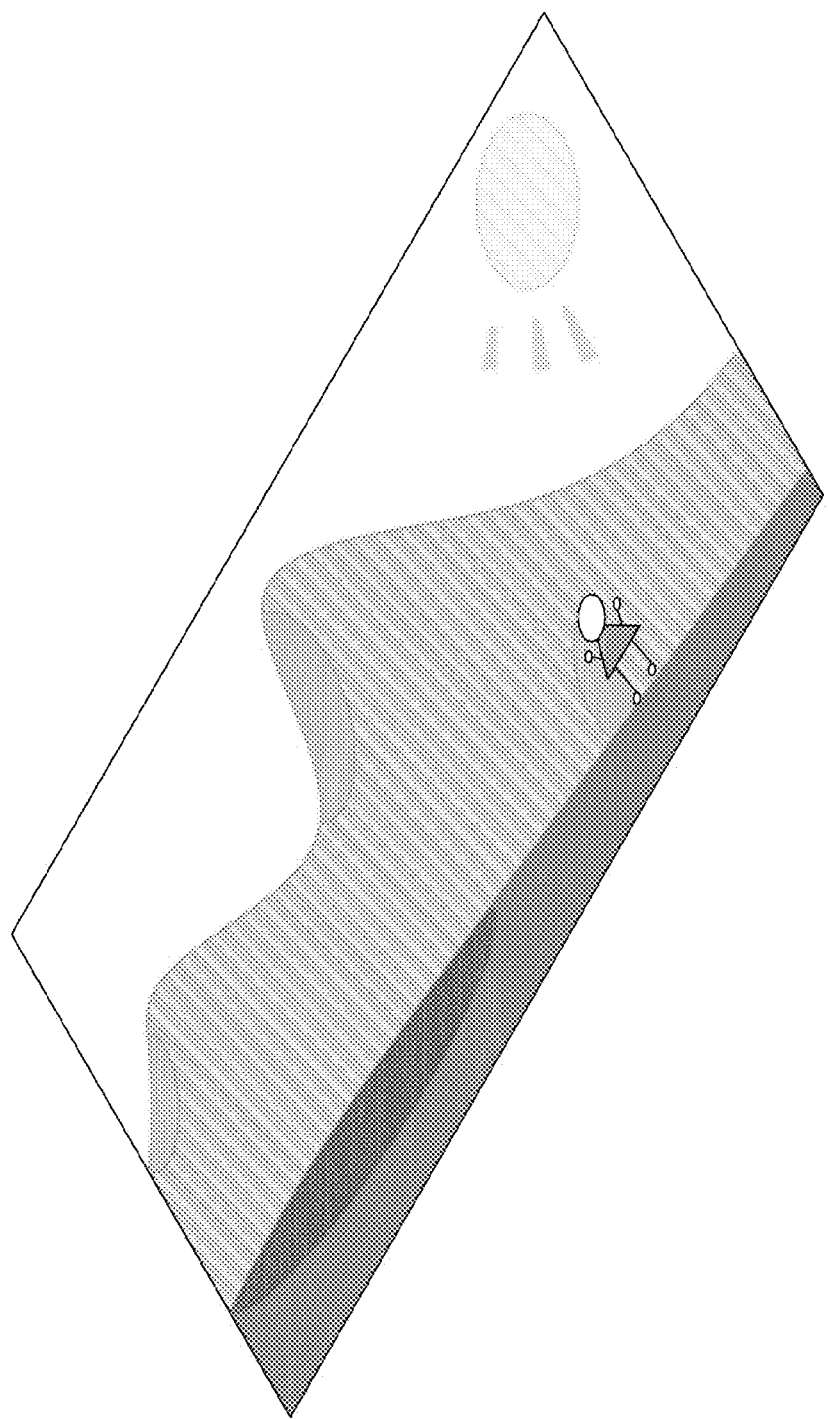
FIG. 4E is a schematic view of a color image provided by a first image sensor of the electronic device shown in FIG. 4A.
Figure 4F:
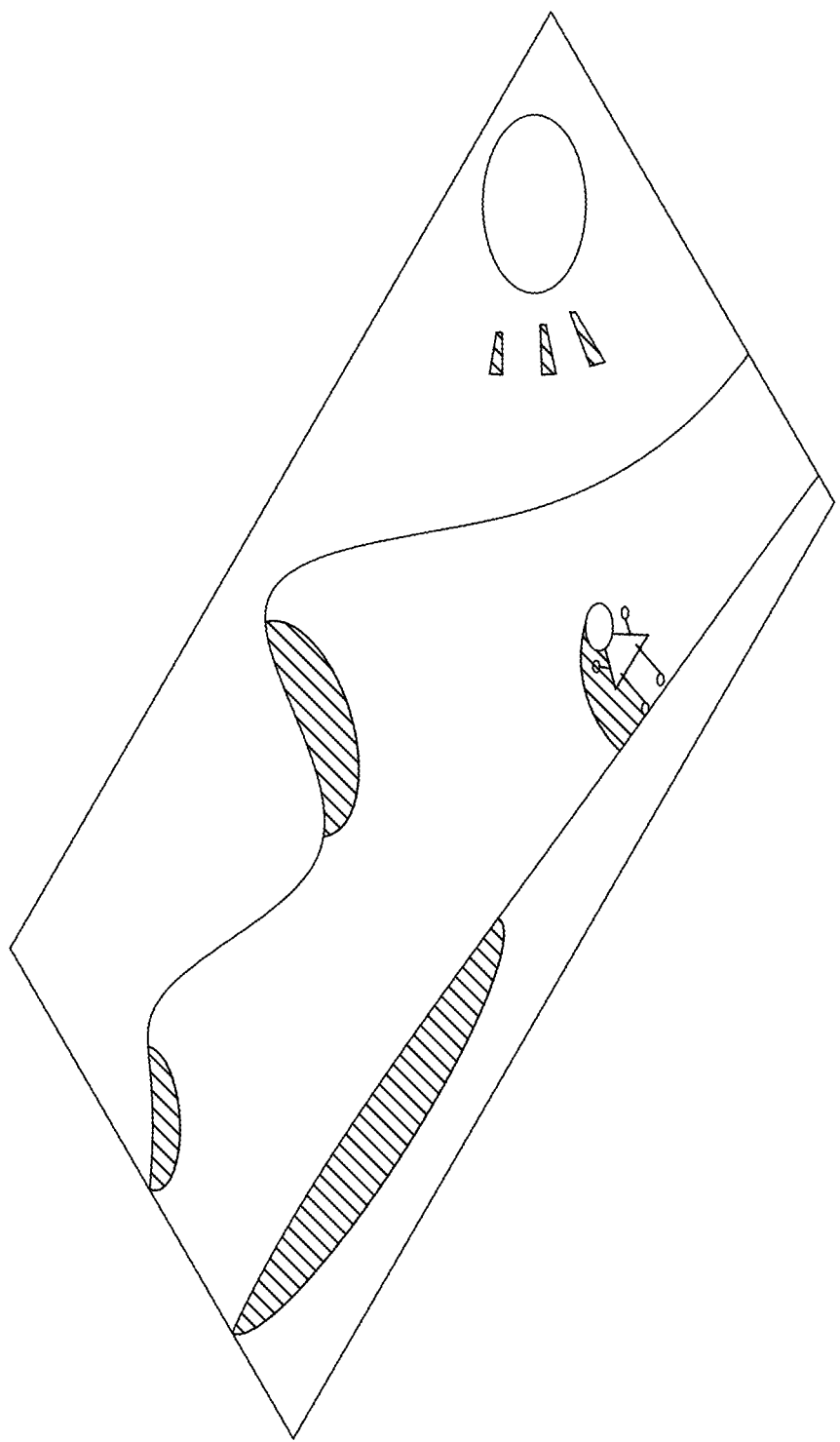
FIG. 4F is a schematic view of a monochrome image provided by a second image sensor of the electronic device shown in FIG. 4A.

FIG. 4E is a schematic view of a color image provided by the first image sensor 181 of the electronic device 10 shown in FIG. 4A. FIG. 4F is a schematic view of a monochrome image provided by the second image sensor 182 of the electronic device 10 shown in FIG. 4A. Specifically, the information of the color image is outputted by the first image sensor 181 and the information of the monochrome image is outputted by the second image sensor 182, and the information of the color image and the information of the monochrome image are provided to relevant elements (not shown) for being processed with dual lens algorithm. With different applications of dual lens, different shooting styles can be achieved, and different shooting demands can be satisfied. Furthermore, with the electronic device 10 equipped with dual lens (i.e., the first lens assembly L1 and the second lens assembly L2), the scene captured by the electronic device 10 can be recorded as a vivid color image and a monochrome image which can exquisitely reflect the change of lights. Comparing to the image processing method of a conventional algorithm, a realer brightness information of the scene captured by the electronic device 10 can be provided. Moreover, with the more abundant information provided by the first image sensor 181 and the second image sensor 182 processed via the dual lens algorithm, a more varied shooting experiences can be provided. Furthermore, the dual lens driving apparatus 100 can provide a quicker shooting function and a quicker auto-focus function, so that a more convenient and complete camera function can be provided by the electronic device 10.

5th Embodiment

Figure 5:
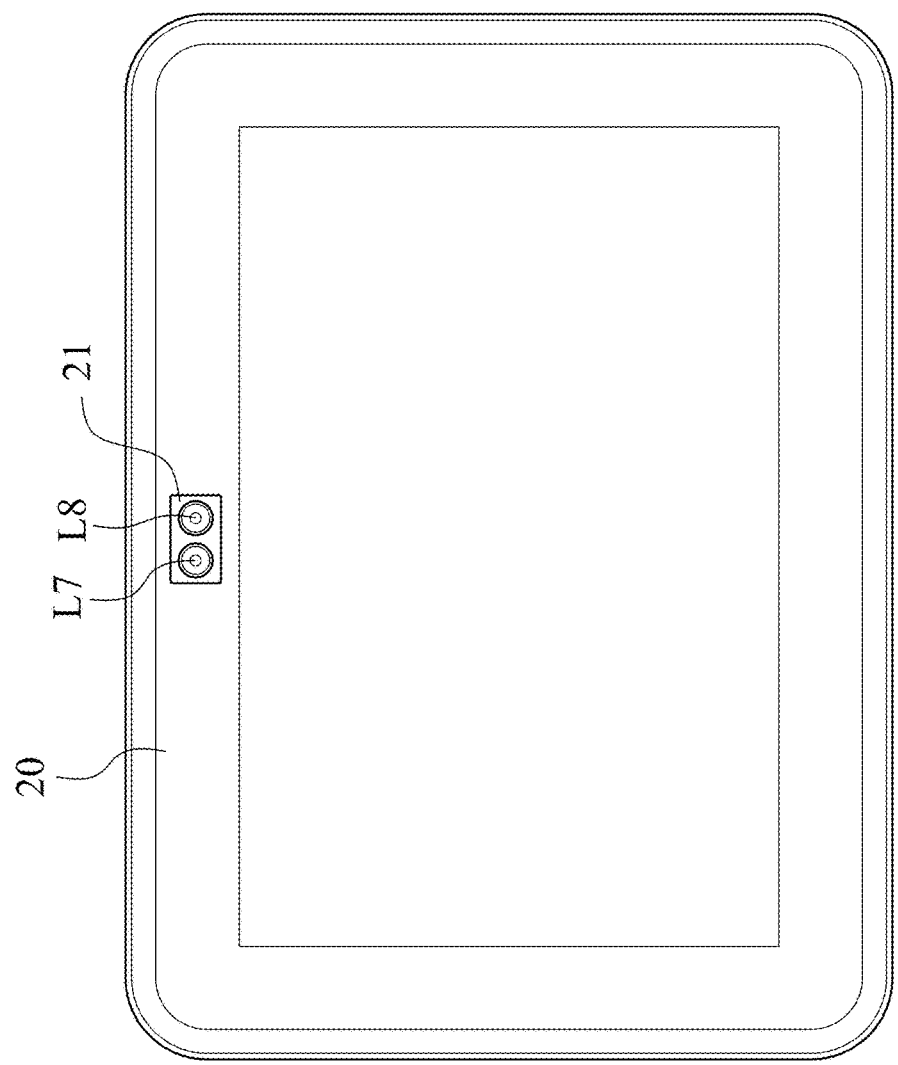
FIG. 5 is a schematic view of an electronic device according to the 5th embodiment of the present disclosure.

FIG. 5 is a schematic view of an electronic device 20 according to the 5th embodiment of the present disclosure. The electronic device 20 of the 5th embodiment is a tablet personal computer. The electronic device 20 includes a dual lens driving apparatus 21 according to the present disclosure, a first lens assembly L7, a second lens assembly L8 and two image sensors (not shown). The first lens assembly L7 is disposed in the first receiving space (not shown) of the dual lens driving apparatus 21, and the second lens assembly L8 is disposed in the second receiving space (not shown) of the dual lens driving apparatus 21. The two image sensors are disposed on an image surface (not shown) of the first lens assembly L7 and an image surface (not shown) of the second lens assembly L8, respectively. The dual lens driving apparatus 21 is configured to drive the first lens assembly L7 and the second lens assembly L8.

6th Embodiment

Figure 6:
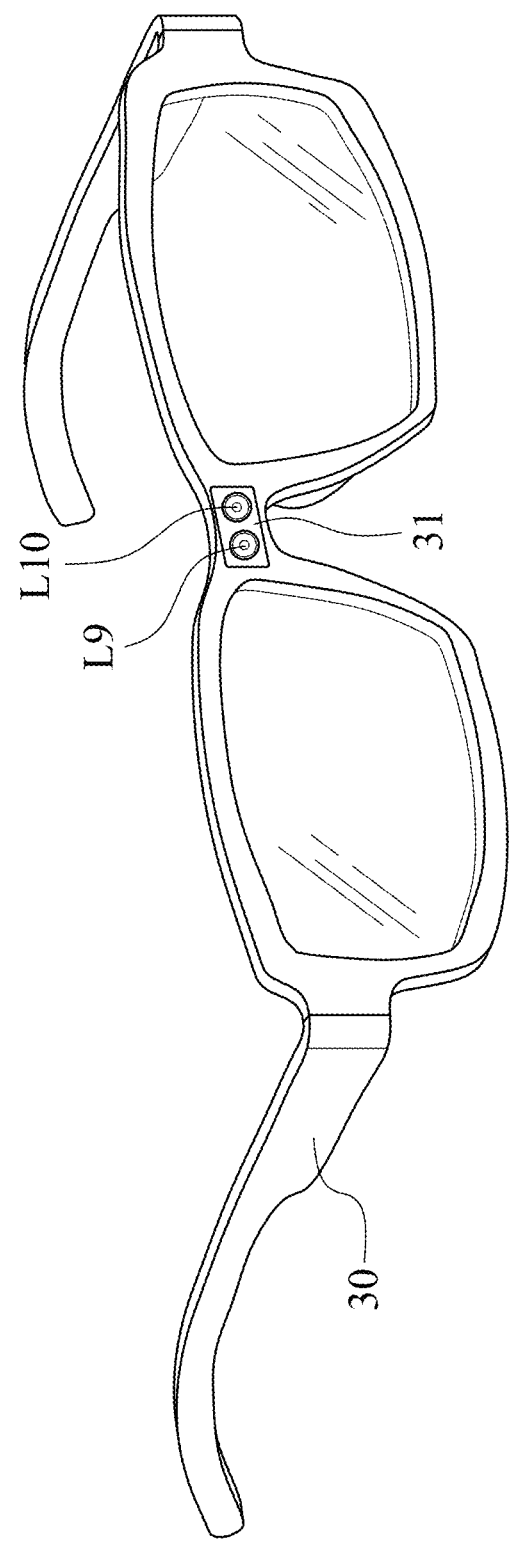
FIG. 6 is a schematic view of an electronic device according to the 6th embodiment of the present disclosure.

FIG. 6 is a schematic view of an electronic device 30 according to the 6th embodiment of the present disclosure. The electronic device 30 of the 6th embodiment is a head-mounted display (HMD). The electronic device 30 includes a dual lens driving apparatus 31 according to the present disclosure, a first lens assembly L9, a second lens assembly L10 and two image sensors (not shown). The first lens assembly L9 is disposed in the first receiving space (not shown) of the dual lens driving apparatus 31, and the second lens assembly L10 is disposed in the second receiving space (not shown) of the dual lens driving apparatus 31. The two image sensors are disposed on an image surface (not shown) of the first lens assembly L9 and an image surface (not shown) of the second lens assembly L10, respectively. The dual lens driving apparatus 31 is configured to drive the first lens assembly L9 and the second lens assembly L10.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dual lens driving apparatus, comprising:
a holder comprising at least one holder opening;
a metal yoke corresponding to the holder, wherein the metal yoke comprises a front end, and the front end comprises:
a plate surface comprising at least one yoke opening, wherein the yoke opening is corresponding to the holder opening; and
a plurality of step portions, wherein a level difference is between each of the step portions and the plate surface;
a carrier movably disposed in the metal yoke, wherein the carrier comprises a first receiving space and a second receiving space for respectively receiving a first lens assembly and a second lens assembly, a central axis of the first receiving space is parallel to a central axis of the second receiving space, and a moving direction of the carrier is parallel to the central axis of the first receiving space and the central axis of the second receiving space;
a coil disposed around the carrier;
a first magnet disposed in the metal yoke, wherein the first magnet is corresponding to the step portions and the coil;
a first elastic element assembled on a side of the carrier facing the front end of the metal yoke, wherein the first elastic element is disposed between the step portions and the first magnet;
a second elastic element assembled on another side of the carrier facing the holder, wherein the second elastic element comprises at least two elastic members, and the elastic members are electrically separated with each other and are arranged on a same plane; and
wherein a maximum length of the metal yoke parallel to a vertical distance between the central axis of the first receiving space and the central axis of the second receiving space is L, a maximum width of the metal yoke orthogonal to the vertical distance between the central axis of the first receiving space and the central axis of the second receiving space is W, the level difference between each of the step portions and the plate surface is d, and the following condition is satisfied:

$$15 < L/d - W/d < 40.$$

2. The dual lens driving apparatus of claim 1, wherein a number of the holder openings is two, and the two holder openings are respectively corresponding to the first receiving space and the second receiving space.

3. The dual lens driving apparatus of claim 2, wherein the holder further comprises two annular grooves, and each of the annular grooves surrounds one of the holder openings.

4. The dual lens driving apparatus of claim 2, wherein a number of the step portions is four, the step portions are formed on four corners of the front end, the metal yoke further comprises a side wall, the side wall is integrally connected with the front end, and the side wall is composed of a plurality of side surfaces with different lengths.

5. The dual lens driving apparatus of claim 4, wherein the maximum length of the metal yoke parallel to a vertical distance between the central axis of the first receiving space and the central axis of the second receiving space is L, the maximum width of the metal yoke orthogonal to the vertical distance between the central axis of the first receiving space and the central axis of the second receiving space is W, and the following condition is satisfied:

$$1.5 < L/W < 4.0.$$

6. The dual lens driving apparatus of claim 3, wherein the carrier further comprises:
a first extending structure corresponding to the first receiving space, wherein the first extending structure extends from the first receiving space to the holder; and
a second extending structure corresponding to the second receiving space, wherein the second extending structure extends from the second receiving space to the holder.

7. The dual lens driving apparatus of claim 6, wherein each of the first extending structure and the second extending structure is corresponding to one of the annular grooves.

8. The dual lens driving apparatus of claim 1, wherein a separated space is between the coil and the carrier, whereby a distance between the coil and the first magnet is adjustable.

9. The dual lens driving apparatus of claim 8, wherein the metal yoke further comprises:
at least one elongated portion disposed at the front end closing to the yoke opening, wherein the elongated portion is parallel to the central axis of the first receiving space and the central axis of the second receiving space and extends toward the holder opening, and the elongated portion is corresponding to the first magnet.

10. The dual lens driving apparatus of claim 8, wherein the metal yoke further comprises:
at least one elongated portion disposed at the front end closing to the yoke opening, wherein the elongated portion is parallel to the central axis of the first receiving space and the central axis of the second receiving space and extends toward the holder opening, and the elongated portion extends into the separated space.

11. The dual lens driving apparatus of claim 8, wherein a width of the separated space is S, and the following condition is satisfied:

$$0.08 \text{ mm} < S < 1.6 \text{ mm}.$$

12. The dual lens driving apparatus of claim 8, wherein the separated space is corresponding to a side of the coil facing the holder.

13. The dual lens driving apparatus of claim 2, further comprising:
   a second magnet disposed on the side of the carrier facing the holder; and
   a sensor element corresponding to the second magnet.

14. An electronic device, comprising:
   the dual lens driving apparatus of claim 1;
   the first lens assembly disposed in the first receiving space;
   the second lens assembly disposed in the second receiving space; and
   two image sensors respectively disposed on an image surface of the first lens assembly and an image surface of the second lens assembly.

15. The electronic device of claim 14, wherein one of the image sensors is for providing a color image, and the other of the image sensors is for providing a monochrome image.

* * * * *